United States Patent
Garud et al.

(10) Patent No.: US 12,244,937 B2
(45) Date of Patent: Mar. 4, 2025

(54) RGB-IR PIXEL PATTERN CONVERSION VIA CONVERSION ENGINE

(71) Applicant: TEXAS INSTRUMENTS INCORPORATED, Dallas, TX (US)

(72) Inventors: Hrushikesh Garud, Bangalore (IN); Rajasekhar Allu, Plano, TX (US); Gang Hua, Katy, TX (US); Pandy Kalimuthu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 19 days.

(21) Appl. No.: 18/309,055

(22) Filed: Apr. 28, 2023

(65) Prior Publication Data
US 2024/0040268 A1    Feb. 1, 2024

Related U.S. Application Data

(60) Provisional application No. 63/393,327, filed on Jul. 29, 2022.

(51) Int. Cl.
| | | |
|---|---|---|
| *H04N 23/85* | (2023.01) | |
| *H04N 23/11* | (2023.01) | |
| *H04N 23/84* | (2023.01) | |
| *H04N 25/13* | (2023.01) | |
| *H04N 25/131* | (2023.01) | |

(52) U.S. Cl.
CPC ............. *H04N 23/85* (2023.01); *H04N 23/11* (2023.01); *H04N 23/843* (2023.01); *H04N 25/131* (2023.01); *H04N 25/135* (2023.01)

(58) Field of Classification Search
CPC .. H04N 23/843; H04N 25/135; H04N 25/131; H04N 23/11
See application file for complete search history.

(56) References Cited

U.S. PATENT DOCUMENTS

| | | | | |
|---|---|---|---|---|
| 10,638,060 | B2 * | 4/2020 | Liu | H04N 23/11 |
| 11,394,902 | B2 * | 7/2022 | Wang | H04N 23/843 |
| 11,558,592 | B1 * | 1/2023 | Yu | H04N 9/646 |
| 11,877,073 | B2 * | 1/2024 | Novikov | H04N 25/131 |
| 12,035,054 | B1 * | 7/2024 | Pawlik | H04N 9/69 |

(Continued)

*Primary Examiner* — Chiawei Chen
(74) *Attorney, Agent, or Firm* — Xianghui Huang; Frank D. Cimino

(57) ABSTRACT

Disclosed herein are improvements to pixel pattern conversion, upsampling, and IR decontamination processes. An example includes an image processing pipeline comprising an upstream component, a pattern conversion component downstream with respect to the upstream component in the image processing pipeline, and a downstream component relative to the pattern conversion component. The pattern conversion component is configured to obtain RGB-IR pixel data produced by the upstream component of the image processing pipeline and convert the RGB-IR pixel data into RGB pixel data and IR pixel data using a conversion engine. The conversion engine is configured to demosaic the RGB-IR pixel into the RGB pixel data and the IR pixel data, remosaic the RGB pixel data into an RGB pattern and the IR pixel data into an IR pattern and remove IR contamination from the RGB pixel data of the RGB pattern for use by the downstream component.

20 Claims, 11 Drawing Sheets

(56) References Cited

U.S. PATENT DOCUMENTS

| | | | | |
|---|---|---|---|---|
| 2007/0153335 | A1* | 7/2007 | Hosaka | H04N 23/843 |
| | | | | 358/463 |
| 2012/0200734 | A1* | 8/2012 | Tang | H04N 25/131 |
| | | | | 348/E9.051 |
| 2014/0307098 | A1* | 10/2014 | Kang | G06F 12/0207 |
| | | | | 348/164 |
| 2017/0163853 | A1* | 6/2017 | Hata | H04N 25/131 |
| 2017/0374299 | A1* | 12/2017 | Liu | H04N 1/6008 |
| 2020/0112662 | A1* | 4/2020 | Sakamoto | G06T 7/74 |
| 2020/0145641 | A1* | 5/2020 | Takahashi | H04N 25/44 |
| 2021/0297607 | A1* | 9/2021 | Wang | H04N 23/843 |
| 2022/0368867 | A1* | 11/2022 | Sato | H04N 25/133 |
| 2023/0074718 | A1* | 3/2023 | Smits | H04N 23/56 |
| 2023/0116000 | A1* | 4/2023 | Novikov | H04N 25/134 |
| | | | | 348/273 |

* cited by examiner

RGB-IR PIXEL PATTERN CONVERSION VIA CONVERSION ENGINE

RELATED APPLICATIONS

This application hereby claims the benefit and priority to U.S. Provisional Application No. 63/393,327, titled "Method for Pattern Conversion and IR Demosaicing with IR Decontamination for 4×4 RGBIR Color Filter Array Image Signal Processing," filed Jul. 29, 2022, which is hereby incorporated by reference in its entirety.

TECHNICAL FIELD

This relates generally to converting pixel arrays from one format to another format for use in image signal processing components.

BACKGROUND

Image sensors and imaging systems, such as camera-based systems, can produce images with red, green, and blue (RGB), and infrared (IR) pixels for visualization and processing. Image signal processing (ISP) techniques can be employed on such images to produce high-quality digital images. In one example of an imaging technique, color filter array (CFA) patterns can be used to capture color information by placing color filters over pixel sensors of an image sensor. Generally, 2×2 patterns (i.e., 4 pixels in a repeating 2 pixel by 2 pixel grid) of RGB filters are most commonly supported by image signal processors (ISPs) or ISP algorithms. Consequently, existing systems do not commonly support 4×4 RGB-IR CFA processing (i.e., 16 pixels in a 4 pixel by 4 pixel grid). Processing of both RGB and IR pixels is important in a variety of uses, including safety features of electronic devices (e.g., Driver Monitoring Systems and Occupant Monitoring Systems), and other non-safety related features of devices, cameras, smart phones, and the like.

Traditional approaches can use programmable processing units and/or imaging pipelines capable of processing 2×2 color filter array (CFA) patterns, but such approaches also fail to process 4×4 RGB-IR CFAs. For example, some imaging pipelines can produce monochrome or multi-color digital images. In some cases, some of these imaging pipelines use color filters with fixed density in the CFA patterns for interpolation. However, such approaches also fail to perform such analysis and pre-processing on raw domain RGBIR images.

In other example software-hardware designs, some imaging pipelines can only process 4×4 RGB-IR CFAs using highly inefficient multiple-pass processing techniques. Such designs require multiple transfers of the CFA data between an imaging pipeline and external memory causing high latency and reduced processing capabilities. Additionally, such designs fail to eliminate IR contamination from RGB pixels to reproduce faithful color in output images.

SUMMARY

Disclosed herein are improvements to image signal processing techniques, such as pixel pattern conversion, upsampling, and IR decontamination. An example embodiment includes an image processing pipeline comprising an upstream component, a pattern conversion component downstream with respect to the upstream component in the image processing pipeline, and a downstream component relative to the pattern conversion component. The pattern conversion component is configured to obtain RGB-IR pixel data produced by the upstream component of the image processing pipeline; convert the RGB-IR pixel data into RGB pixel data and IR pixel data using a conversion engine configured to demosaic the RGB-IR pixel into the RGB pixel data and the IR pixel data, remosaic the RGB pixel data into a RGB pattern (e.g., a 2×2 RGB CFA pattern) and the IR pixel data into an IR pattern (e.g., a 2×2 IR pattern), and remove IR contamination from the RGB pixel data of the RGB pattern; and supply the RGB pattern and the IR pattern to the downstream component of the image processing pipeline.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The drawings are not necessarily drawn to scale. In the drawings, like reference numerals designate corresponding parts throughout the several views. In some embodiments, components or operations may be separated into different blocks or may be combined into a single block.

DETAILED DESCRIPTION

Figure 1:
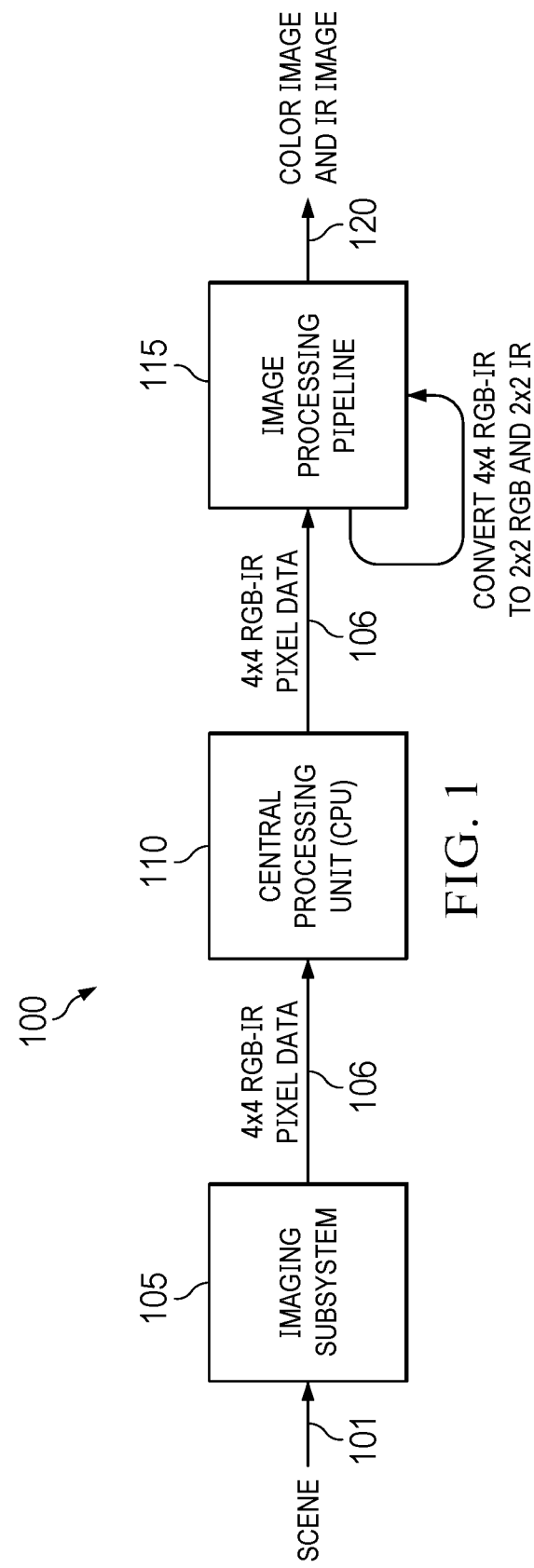
FIG. 1 illustrates an example environment configurable to perform pixel pattern conversion.

Discussed herein are enhanced components, techniques, and systems related to color filter array (CFA) pattern conversion, and more specifically, to converting 4×4 red-green-blue and infrared (RGB-IR) CFA patterns to other formats via a conversion engine. The term pixel is often used to refer to an image sensor pixel, the smallest identifiable portion of an image sensor that provides a discrete value based on received light, and to refer to an image pixel, the smallest identifiable portion of an image having a single value, which is often produced by a corresponding image sensor pixel. A CFA pattern is a mosaic of tiny optical filters (also referred to as color channels) placed over the sensor pixels such that only a single-color filter is present at each location. A variety of imaging systems are now able to produce 4×4 RGB-IR CFA patterns, whereby 50% of the filters are green pixels, 25% are IR pixels, 12.5% are red pixels, and 12.5% are blue pixels. However, as mentioned, image signal processors (ISPs), and components thereof, cannot use complex CFA patterns, such as 4×4 RGB-IR CFA patterns, as inputs for various image processing activities. Not only must 4×4 RGB-IR CFA patterns often be separated into 2×2 RGB CFA patterns (e.g., a Bayer pattern) and 2×2 IR CFA patterns, but also the pixels in the 4×4 RGB-IR CFA patterns often require upsampling and decontamination, or cross-channel talk suppression, to produce full-resolution, high quality color and IR images. Advantageously, apparatuses, devices, and systems described herein can support processing of 4×4 RGB-IR CFA pattern images, as well as any 2×2 CFA pattern, for conversion to other 2×2 CFA patterns. Accordingly, the improvements and methods described herein provide ways to analyze pixels on-the-fly, by using a conversion engine, to perform upsampling, IR subtraction, or IR decontamination, and remosaicing of CFA patterns from one format to another format.

One example includes an image processing pipeline comprising an upstream component, a pattern conversion component downstream with respect to the upstream component in the image processing pipeline, and a downstream component relative to the pattern conversion component. The pattern conversion component is configured to obtain RGB-IR pixel data produced by the upstream component of the image processing pipeline and convert the RGB-IR pixel data into RGB pixel data and IR pixel data using a conversion engine. The conversion engine is configured to demosaic the RGB-IR pixel into the RGB pixel data and the IR pixel data, remosaic the RGB pixel data into an RGB pattern and the IR pixel data into an IR pattern, and remove IR contamination from the RGB pixel data of the RGB pattern. The pattern conversion component can further supply the RGB pattern and the IR pattern to the downstream component of the image processing pipeline.

In another example, a pattern conversion component in an image processing pipeline is provided. The pattern conversion component comprises an interface and circuitry coupled to the interface. The interface is configured to communicate with upstream components and downstream components of the image processing pipeline relative to the pattern conversion component. The circuitry is configured to obtain, via the interface, RGB-IR pixel data produced by an upstream component of the image processing pipeline and convert the RGB-IR pixel data into RGB pixel data and IR pixel data using a conversion engine. The conversion engine is configured to demosaic the RGB-IR pixel into the RGB pixel data and the IR pixel data, remosaic the RGB pixel data into a RGB pattern and the IR pixel data into an IR pattern, and remove IR contamination from the RGB pixel data of the RGB pattern. The circuitry can further supply, via the interface, the RGB pattern and the IR pattern to a downstream component of the image processing pipeline.

In yet another embodiment, a method of operating a pattern conversion component of an image processing pipeline is provided. The method includes obtaining RGB-IR pixel data produced by a component of the image processing pipeline upstream relative to the pattern conversion component. The method further includes converting the RGB-IR pixel data into RGB pixel data and IR pixel data by various image processing functions. For example, converting the RGB and IR pixel data includes demosaicing the RGB-IR pixel data into the RGB pixel data and the IR pixel data, remosaicing the RGB pixel data into a RGB pattern and the IR pixel data into an IR pattern, and removing IR contamination from the RGB pixel data of the RGB pattern. The method then includes supplying the RGB pattern and the IR pattern to a downstream component of the image processing pipeline relative to the pattern conversion component.

FIG. 1 illustrates an example system configurable to perform pixel pattern conversion. FIG. 1 shows system 100, which includes imaging subsystem 105, central processing unit (CPU) 110, and image processing pipeline 115. Imaging subsystem 105 captures 4×4 RGB-IR pixel data 106 from scene 101. 4×4 RGB-IR pixel data 106 is provided to CPU 110, and further supplied to image processing pipeline 115 for processing and conversion to produce color and IR images 120 (referred to herein as images 120). In an example embodiment, such processes can be performed on 2×2 color filter array (CFA) inputs and/or 4×4 CFA inputs with red-green-blue and infrared (RGB-IR) pixels.

In operation, imaging subsystem 105 is configured to capture data from scene 101. Imaging subsystem 105 may be a camera, one or more image sensors, a camera-based driver monitoring system (DMS), a camera-based occupant monitoring system (OMS), or the like, capable of producing images, videos, or frames from scene 101. Imaging subsystem 105 can produce an output made of a plurality of image pixels of various color channels in a pattern, such as 4×4 RGB-IR pixel data 106. In such an example, 4×4 RGB-IR pixel data 106 includes pixels arranged in a 4×4 pattern whereby each pixel is associated with one of a red, blue, green, or infrared (IR) color channel. More specifically, the pattern includes 50% green pixels, 25% IR pixels, 12.5% red pixels, and 12.5% blue pixels. Other pixel data having different color patterns can also be contemplated.

Imaging subsystem 105 provides 4×4 RGB-IR pixel data 106 to CPU 110. CPU 110 can store 4×4 RGB-IR pixel data 106 in memory, perform image processing activities on the data, and/or provide the data to one or more subsystems or peripherals in communication with CPU 110. In one example, CPU 110 is included as part of a system-on-chip (SoC) configured to perform pixel pattern conversion processes described herein, among other functions. In this example, CPU 110 provides 4×4 RGB-IR pixel data 106 to image processing pipeline 115, which may also be a part of the SoC, to perform the pixel pattern conversion processes.

Image processing pipeline 115 includes components configured to perform pre-processing activities, pattern conversion, statistics generation, noise filtering, and/or other ISP activities on 4×4 RGB-IR pixel data 106. More specifically, image processing pipeline 115 can include a pattern conversion component configured to convert the 4×4 RGB-IR pattern of 4×4 RGB-IR pixel data 106 into pixel data having multiple, different patterns, such as a 2×2 RGB (red-green-blue) pattern and a 2×2 IR pattern. Such converted pixel data may then be used by other components of image processing pipeline 115 to produce images 120 (e.g., a color image and an IR image). Additional example details of image signal processors (ISPs), and components thereof, capable of processing 4×4 RGB-IR pixel data can be found in commonly assigned U.S. patent application Ser. No. 17/129,818, entitled "Method and Apparatus for Processing RGB-Infrared (RGB-IR) Sensor Data," filed on Dec. 21, 2020, U.S. patent application Ser. No. 18/147,964, entitled "RGBIR COLOR FILTER IMAGE PROCESSING WITH LENS SHADING CORRECTION," filed on Dec. 29, 2022, U.S. Provisional Patent Application No. 63/393,310, entitled "RGB-IR COLOR FILTER IMAGE PROCESSING WITH LENS SHADING CORRECTION," filed on Nov. 9, 2022, U.S. patent application Ser. No. 17/983,905, entitled "DEFECTIVE PIXEL DETECTION," filed on Nov. 9, 2022, and U.S. patent application Ser. No. 18/175,697, entitled "RBG-IR PIXEL PATTERN CONVERSION VIA ADAPTIVE FILTERING," filed on Feb. 28, 2023, all of which are incorporated by reference in their entirety.

In various examples, the pattern conversion component of image processing pipeline 115 uses a conversion engine to convert the 4×4 RGB-IR pattern of 4×4 RGB-IR pixel data 106 to two 2×2 CFA patterns. The conversion engine may be configured to demosaic the 4×4 RGB-IR pixel data 106 into RGB pixel data and IR pixel data, remosaic the RGB pixel data into a 2×2 RGB pattern and the IR pixel data into a 2×2 IR pattern, and remove IR contamination from the RGB pixel data of the RGB pattern. To demosaic the pixel data, the conversion engine may be configured to, for each pixel of 4×4 RGB-IR pixel data 106, identify a context of a given pixel, interpolate, based on the context, a red, green, or blue pixel value for the given pixel for the RGB pixel data, and interpolate, based on the context, an IR pixel value for the given pixel based on the context for the IR pixel data. Context refers to information or characteristics of RGB-IR pixel data 106. More specifically, a context of a given pixel may refer to characteristics of the 4×4 RGB-IR pixel data 106 at or around a location associated with the given pixel and characteristics of neighboring pixels with respect to the given pixel. By way of example, context of a given pixel may refer to characteristics of the given pixel in 4×4 RGB-IR pixel data 106 indicating a presence or absence of image features at or around the pixel location. To remosaic the RGB pixel data into the RGB pattern, the conversion engine can be configured to map the interpolated pixel values to locations in respective patterns. For example, the conversion engine maps red, green, and blue pixels to locations in the RGB pattern and IR pixel values to locations in the IR pattern. To remove IR contamination (i.e., IR light) from the RGB pixel data, the conversion engine can be configured to, for each pixel of 4×4 RGB-IR pixel data 106, determine an amount of IR contamination corresponding to a given pixel. Then, the conversion engine can subtract the amount of IR from the interpolated pixel value of the given pixel.

Still referring to FIG. 1, image processing pipeline 115 and components thereof are representative of fixed-purpose hardware capable of implementing the pattern conversion processes described herein. Examples of image processing pipeline 115 include integrated circuits (ICs), application specific integrated circuits (ASICs), logic devices, and other such circuitry, as well as any combination or variation thereof. Alternatively, image processing pipeline 115 may be implemented as general purpose hardware, such as a microprocessor, capable of executing software and/or firmware that embodies the logic of the pattern conversion processes disclosed herein. Image processing pipeline 115 may be implemented within a single processing device, but it may also be distributed across multiple processing devices or subsystems that cooperate in executing instructions.

Image processing pipeline 115, and components thereof, can also be configured to convert CFA patterns, other than 4×4 RGB-IR CFA patterns, to different CFA patterns. Examples of other CFA patterns include various Bayer patterns, RGBE, RYYB, CYYM, CYGM, RGBW, RCCC, and RCCB patterns, among other CFA patterns.

Figure 2:
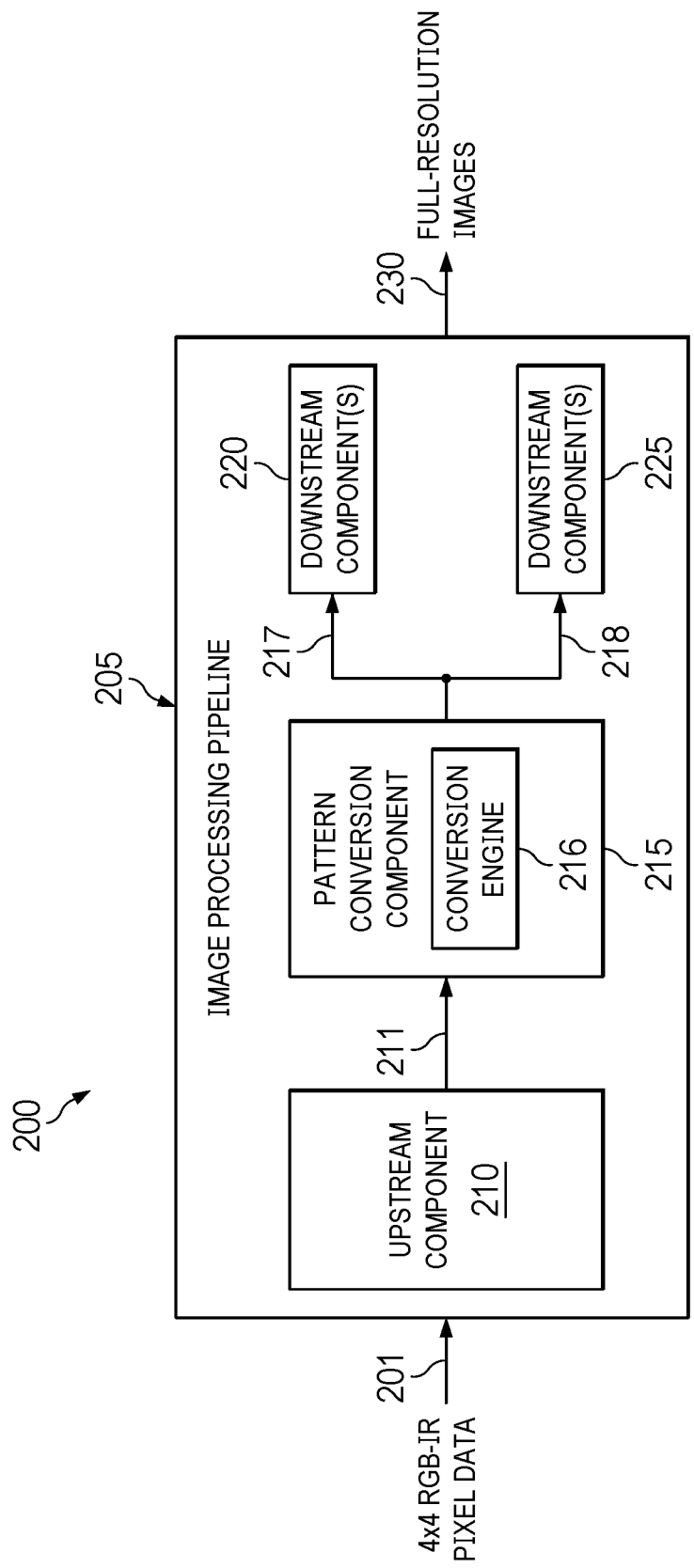
FIG. 2 illustrates an example system configurable to perform pixel pattern conversion.

FIG. 2 illustrates an example operating environment configurable to perform pixel pattern conversion. FIG. 2 shows operating environment 200, which includes image processing pipeline 205 and components thereof. Image processing pipeline 205 includes upstream component 210, pattern conversion 215, and downstream components 220 and 225. Image processing pipeline 205 is representative of an image signal processing (ISP) pipeline (e.g., image processing pipeline 115 of FIG. 1) or vision imaging subsystem (VISS) configurable to obtain 4×4 RGB-IR pixel data 201 (e.g., from CPU 110 of FIG. 1), process and convert the pixel data, and produce full-resolution images 230.

In operation, image processing pipeline 205 is configured to obtain 4×4 RGB-IR pixel data 201. 4×4 RGB-IR pixel data 201 is representative of pixel data in a 4×4 CFA pattern, such as in a RGB-IR pattern, captured by an imaging system (e.g., imaging system 105). Each pixel in 4×4 RGB-IR pixel data 201 may have a different value than other pixels in the 4×4 CFA pattern. Values of the pixels of the 4×4 RGB-IR pixel data 201 may be based on image features occurring at locations in the image data. For example, image features may cause some locations to appear brighter than others, darker than others, include edges or corners, or the like.

Upstream component 210 of image processing pipeline 205 is first configured to receive 4×4 RGB-IR pixel data 201. Upstream component 210 is representative of any component of image processing pipeline 205 upstream in image processing pipeline 205 relative to pattern conversion component 215 and downstream components 220 and 225. For example, upstream component 210 may be a defective pixel correction component or another image processing component configured to perform front-end processing on 4×4 RGB-IR pixel data 201 and produce 4×4 RGB-IR pixel data 211 to be used by pattern conversion component 215.

Pattern conversion component 215 is representative of a component of image processing pipeline 205 configurable to obtain 4×4 RGB-IR pixel data 211, convert 4×4 RGB-IR pixel data 211 from a 4×4 RGB-IR pixel pattern to both a 2×2 RGB pixel pattern (e.g., a Bayer pattern) and a 2×2 IR pixel pattern, and supply the converted pixel data (e.g., 2×2 RGB pixel data 217 and 2×2 IR pixel data 218) to downstream components 220 and 225. To do so, pattern conversion component 215 includes conversion engine 216. In various examples, conversion engine 216 includes fixed-purpose, dedicated hardware (e.g., circuitry).

First, conversion engine 216 can demosaic the 4×4 RGB-IR pixel data 106 into RGB pixel data and IR pixel data, remosaic the RGB pixel data into a 2×2 RGB pattern and the IR pixel data into a 2×2 IR pattern, and remove IR contamination from the RGB pixel data of the RGB pattern. To demosaic the pixel data, the conversion engine 216 may be configured to, for each pixel of 4×4 RGB-IR pixel data 106, identify a context of a given pixel, interpolate, based on the context, a red, green, or blue pixel value for the given pixel for the RGB pixel data, and interpolate, based on the context, an IR pixel value for the given pixel for the IR pixel data. Context refers to information or characteristics of RGB-IR pixel data 106. More specifically, a context of a given pixel may refer to characteristics of the 4×4 RGB-IR pixel data 106 at or around a location associated with the given pixel and characteristics of neighboring pixels with respect to the given pixel. By way of example, context of a given pixel may refer to characteristics of the given pixel in 4×4 RGB-IR pixel data 106 indicating a presence or absence of image features at or around the pixel location. To remosaic the RGB pixel data into the RGB pattern, the conversion engine 216 can be configured to map the interpolated pixel values to locations in other CFA patterns. For example, the conversion engine 216 maps red, green, and blue pixels to locations in the RGB pattern and IR pixel values to locations in the IR pattern. To remove IR contamination from the RGB pixel data, the conversion engine 216 can be configured to, for each pixel of 4×4 RGB-IR pixel data 106, determine an amount of IR contamination corresponding to a given pixel. Then, the conversion engine 216 can subtract the amount of IR from the interpolated pixel value of the given pixel.

Pattern conversion component 215 then provides 2×2 RGB pixel data 217, or the 2×2 RGB pattern, to downstream components 220 and 2×2 IR pixel data 218, or the 2×2 IR pattern, to downstream components 220 or 225. Downstream components 220 and 225 are representative of any components of image processing pipeline 205 downstream in image processing pipeline 205 relative to upstream component 210 and pattern conversion component 215. For example, one of downstream components 220 and 225 may be a noise filter or another ISP component configured to perform operations on either or both of 2×2 RGB pixel data 217 and 2×2 IR pixel data 218. Following operations by downstream components 220 and 225, image processing pipeline 205 can produce full-resolution images 230.

Figure 3:
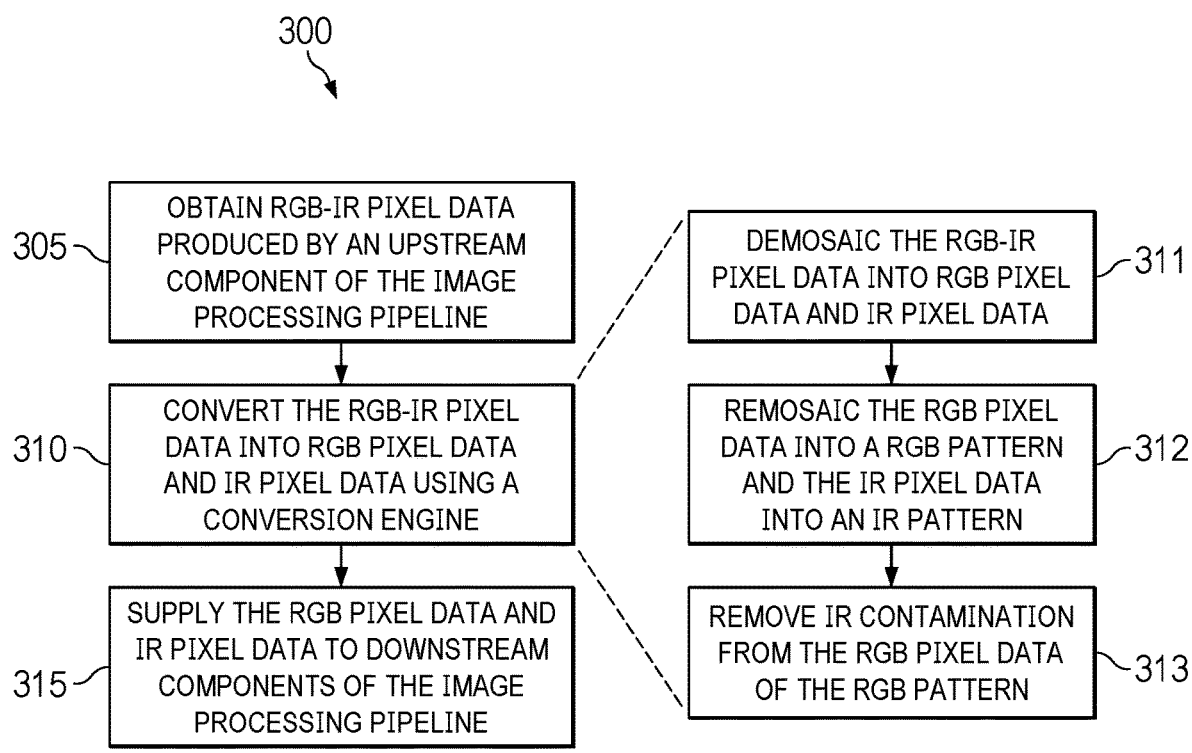
FIG. 3 illustrates a series of steps for converting pixel data from one format to other formats using a conversion engine.

FIG. 3 is a flow diagram illustrating a method for converting pixel data from one format to other formats in an image processing pipeline. FIG. 3 includes process 300 described parenthetically below, which references elements of FIG. 2. Process 300 can be implemented on fixed-purpose, dedicated hardware, programmable hardware, or a combination thereof. For example, process 300 can be performed by pattern conversion component 215, or an adaptive filter thereof, such as conversion engine 216, or another apparatus or device.

In operation 305, pattern conversion component 215 obtains 4×4 RGB-IR pixel data 211 produced by upstream component 210 of image processing pipeline 205. Upstream component 210 is representative of any component of image processing pipeline 205 upstream in image processing pipeline 205 relative to pattern conversion component 215 and downstream components 220 and 225. For example, upstream component 210 may be a defective pixel correction component or another ISP component configured to perform front-end processing on 4×4 RGB-IR pixel data 201 and produce 4×4 RGB-IR pixel data 211 to be used by pattern conversion component 215.

In operation 310, pattern conversion component 215 converts the 4×4 RGB-IR pixel data 211 into 2×2 RGB pixel data 217 and 2×2 IR pixel data 218 using conversion engine 216. Pattern conversion component 215 is representative of a component of image processing pipeline 205 configured to convert 4×4 RGB-IR pixel data 211 from a 4×4 RGB-IR pixel pattern to both a 2×2 RGB pixel pattern (e.g., a Bayer pattern) and a 2×2 IR pixel pattern. To do so, pattern conversion component 215 includes conversion engine 216, which further includes circuitry, or fixed-purpose, dedicated hardware components, Conversion engine 216, in operation 311, first demosaics the 4×4 RGB-IR pixel data 211 into RGB pixel data 217 and IR pixel data 218. To demosaic the pixel data, conversion engine 216 may be configured to, for each pixel of 4×4 RGB-IR pixel data 211, identify a context of a given pixel, interpolate, based on the context, a red, green, or blue pixel value for the given pixel for RGB pixel data 217, and interpolate, based on the context, an IR pixel value for the given pixel. Context refers to information or characteristics of RGB-IR pixel data 211. More specifically, a context of a given pixel may refer to characteristics of the 4×4 RGB-IR pixel data 211 at or around a location associated with the given pixel and characteristics of neighboring pixels with respect to the given pixel. By way of example, context of a given pixel may refer to characteristics of the given pixel in 4×4 RGB-IR pixel data 211 indicating a presence or absence of image features at or around the pixel location.

Then, conversion engine 216, in operation 312, remosaics RGB pixel data 217 into an RGB pattern and IR pixel data 218 into an IR pattern. To remosaic RGB pixel data 217 into the RGB pattern and IR pixel data 218 into the IR pattern, conversion engine 216 can be configured to map the interpolated pixel values to locations in respective patterns. More specifically, conversion engine 216 can map red, green, and blue pixels to locations in the RGB pattern and IR pixel values to locations in the IR pattern. For example, for a first red pixel at a first location in the 4×4 pattern of RGB-IR pixel data 211, conversion engine 216 can map an interpolated red pixel corresponding to the first red pixel to a first location in the 2×2 pattern of RGB pixel data 217. Likewise, for the first red pixel at the first location, conversion engine 216 can map an interpolated IR pixel corresponding to the first red pixel to a first location in the 2×2 pattern of IR pixel data 218.

In operation 313, conversion engine 216 removes IR contamination from RGB pixel data 217 of the RGB pattern. To remove IR contamination from RGB pixel data 217, conversion engine 216 can be configured to, for each pixel of 4×4 RGB-IR pixel data 211, determine an amount of IR contamination corresponding to a given pixel. Following the previous example, for the first red pixel, conversion engine 216 can determine an IR amount present in the first red pixel. Then, conversion engine 216 can subtract the amount from the interpolated pixel value of the first red pixel. Conversion engine 216 can determine a different IR amount for each pixel. However, conversion engine 216 may also determine the same IR amount for some pixels of 4×4 RGB-IR pixel data 211.

Lastly, in operation 315, pattern conversion component 215 supplies (315) 2×2 RGB pixel data 217 and 2×2 IR pixel data 218 to downstream components (e.g., downstream components 220 and downstream components 225, respectively) of image processing pipeline 205. Downstream components 220 and 225 are representative of any components of image processing pipeline 205 downstream in image processing pipeline 205 relative to upstream component 210 and pattern conversion component 215. For example, one of downstream components 220 and 225 may be a noise filter or another ISP component configured to perform operations on either or both of 2×2 RGB pixel data 217 and 2×2 IR pixel data 218. Upon completion of process 300, pattern conversion component 215 can produce both remosaiced 2×2 RGB pixel data 217 and 2×2 IR pixel data 218.

Figure 4:
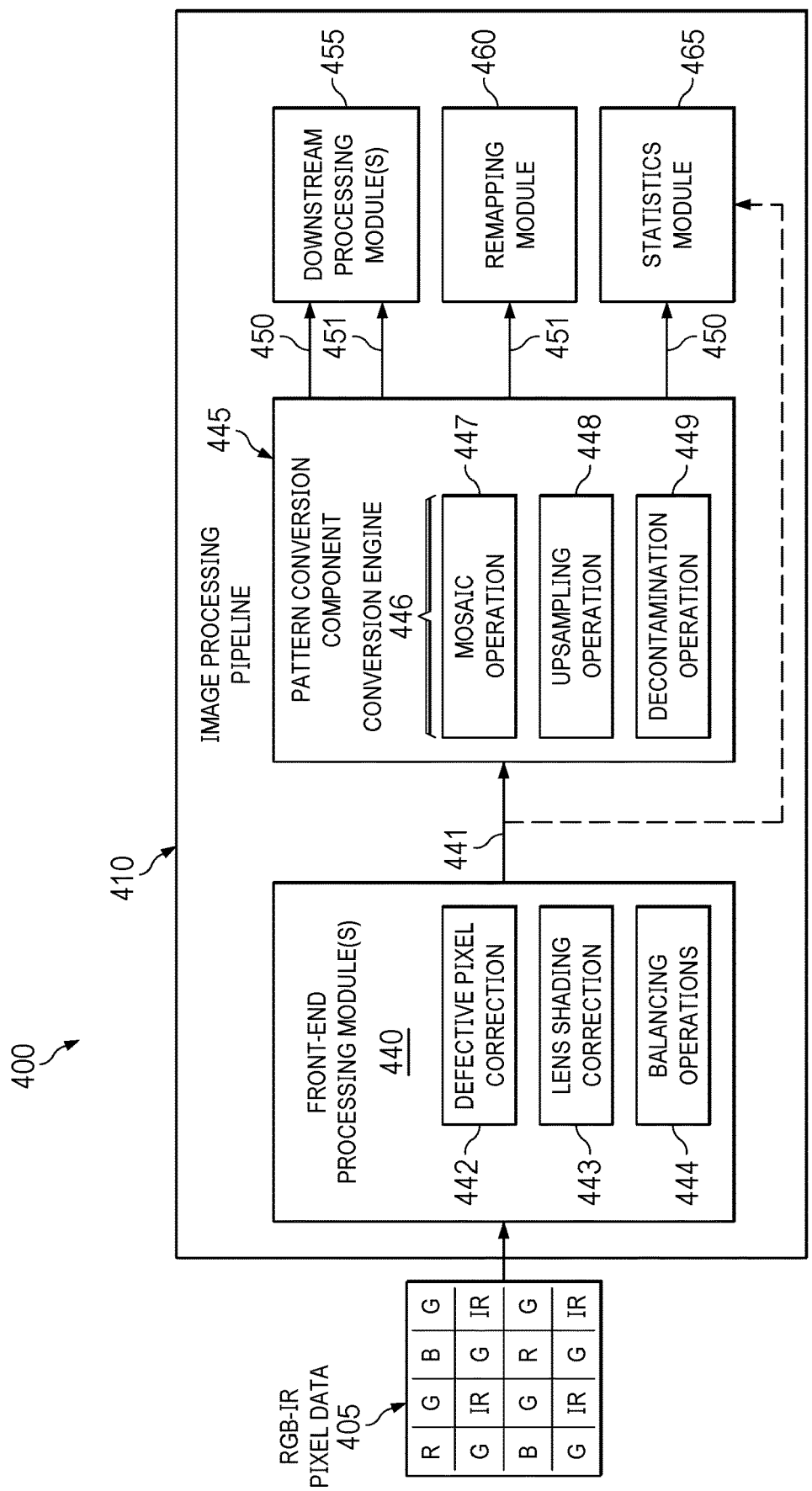
FIG. 4 illustrates an example system for processing and converting pixel data in an embodiment.

FIG. 4 illustrates an example operating environment for processing and converting pixel data in an embodiment. FIG. 4 includes operating environment 400, which further includes image processing pipeline 410 and components thereof configured to perform operations on input pixel data, such as RGB-IR pixel data 405. Image processing pipeline 410 includes front-end processing modules 440, pattern conversion component 445, downstream processing module(s) 455, remapping module 455, and statistics module 460. For example, image processing pipeline 410 may represent image processing pipeline 115 of FIG. 1 or image processing pipeline 205 of FIG. 2. Accordingly, image processing pipeline 410, or conversion engine 446 thereof, may implement process 300 of FIG. 3.

In operation, image processing pipeline 410 is configured to obtain RGB-IR pixel data 405. RGB-IR pixel data 405 includes a plurality of pixels arranged in a 4×4 CFA pattern, such as in a RGB-IR pattern, captured by an imaging system. In operating environment 400, RGB-IR pixel data 405 illustrates a 4×4 portion of the pixel data to demonstrate an example RGB-IR pattern. Each pixel of RGB-IR pixel data 405 may have different values (e.g., a red pixel may have a greater red value than another red pixel) than other pixels in RGB-IR pixel data 405. For example, some pixels may have higher brightness value than other pixels, which may indicate an image feature represented in RGB-IR pixel data 405. By way of another example, some pixels may have values indicative of an image feature including a nearby edge, corner, or both.

Front-end processing module(s) 440 of image processing pipeline 410 is configured to receive RGB-IR pixel data 405. Front-end processing module(s) 440 is representative of one or more pre-processing components of image processing pipeline 410, upstream in image processing pipeline 410 relative to pattern conversion component 445 and other downstream components of image processing pipeline 410. In operating environment 400, front-end processing module(s) 440 includes defective pixel correction 442, lens shading correction 443, and balancing operations 444. Defective pixel correction 442 can be used to correct defective image pixels of RGB-IR pixel data 405. Lens shading correction 443 can be used to improve uniformity of brightness and color of the pixels of RGB-IR pixel data 405. Balancing operations 444 can be used to balance intensities of colors of the pixels of RGB-IR pixel data 405. Following operations by the components of front-end processing module(s) 440 of image processing pipeline 410, front-end processing module(s) 440 can provide RGB-IR pixel data 441 to pattern conversion component 445.

Pattern conversion component 445 is representative of a pattern converter configured to obtain RGB-IR pixel data 441, convert RGB-IR pixel data 441 from a 4×4 RGB-IR pixel pattern to both a 2×2 RGB pixel pattern (e.g., a Bayer pattern) and a 2×2 IR pixel pattern, and supply the converted pixel data (e.g., RGB pixel data 450 and IR pixel data 451) downstream in image processing pipeline 410. Pattern conversion component 445 includes conversion engine 446, which controls mosaic operation 447, upsampling operation 448, and decontamination operation 449. Each operation can be performed concurrently or sequentially in different orders. Conversion engine 446 can perform each of the operations on a single component or on multiple components, such as on a system on chip (SoC). However, any variation and/or combination of order and processing location and method can be contemplated.

Upsampling operation 448 refers to a process of increasing the resolution of the pixels of RGB-IR pixel data 441. Upsampling operation 448 may entail identifying pixel values of the pixels in RGB-IR pixel data 441, identifying context of the pixels, and determining one or more upsampled, or interpolated, values for each pixel of RGB-IR pixel data 441 based on the context. In various examples, upsampling operation 448 can be performed to obtain upsampled pixel values for both visible light pixels (e.g., red, green, and blue) and for non-visible light pixels (e.g., IR).

Mosaic operation 447 refers to a process of creating a pattern using the upsampled, or interpolated, pixel values of RGB-IR pixel data 441. For example, conversion engine 446 can perform mosaic operation 447 to produce a 2×2 RGB pattern and a 2×2 IR pattern from RGB-IR pixel data 441. More specifically, conversion engine 446 can, for each pixel of RGB-IR pixel data 441, identify a pixel and a location associated with the given pixel in the 4×4 RGB-IR pattern, identify an interpolated pixel value for the given pixel, and use the interpolated pixel value in a corresponding location in the 2×2 RGB pattern or the 2×2 IR pattern. By way of example, for a first red pixel of RGB-IR pixel data 441 in a first location of the 4×4 pattern, conversion engine 446 can identify an interpolated red value corresponding to the first red pixel and place the interpolated red value in a first location of the 2×2 RGB pattern. Likewise, conversion engine 446 may identify an interpolated IR value corresponding to the first red pixel and place the interpolated IR value in a first location of the 2×2 IR pattern, which may replace the first red pixel. Mosaic operation 447 can be performed for each pixel in RGB-IR pixel data 441 until both the 2×2 RGB pattern(s) and 2×2 IR pattern(s) are created for the RGB-IR pixel data 441.

Decontamination operation 449 may refer to decontaminating red, green, and blue pixels of IR values. Decontamination operation 449 may entail identifying values of each of the pixels, including an amount of IR in each value, identifying the context of the pixels, and subtracting the IR amount from the pixel values of the pixels based on the context. In some cases, decontamination operation 449 is performed only on red, green, and blue pixels, and consequently, affects RGB pixel data 450 by subtracting IR values from the pixels in the 2×2 RGB pixel pattern.

Pattern conversion component 445 provides RGB pixel data 450 (i.e., the 2×2 RGB pixel pattern) and IR pixel data 451 (i.e., the 2×2 IR pixel pattern) to downstream processing module(s) 455. Downstream processing module(s) 455 represent any processing component(s) of image processing pipeline 410 downstream relative to front-end processing module(s) 440 and pattern conversion component 445. For example, downstream processing module(s) may include a noise filter, a tone mapper, a color processor, or any other ISP component. Downstream processing module(s) 455 can be configured to perform operations on either or both of RGB pixel data 450 and IR pixel data 451.

Pattern conversion component 445 also provides RGB pixel data 450 to statistics module 465 and IR pixel data 451 to remapping module 460. Remapping module 460 can remap IR pixel values of the IR pixel data 451 when producing a full-resolution IR image. Statistics module 465 can use RGB pixel data 450 and RGB-IR pixel data 441 to produce statistics and other information about the pixels. For example, statistics module 465 can provide information about defective pixels, pixels that were corrected, and characteristics of the pixels for auto-exposure, among other information. Following operations by downstream processing module(s) 455, remapping module 460, and statistics module 465, image processing pipeline 410 can produce full-resolution images.

Figure 5A:
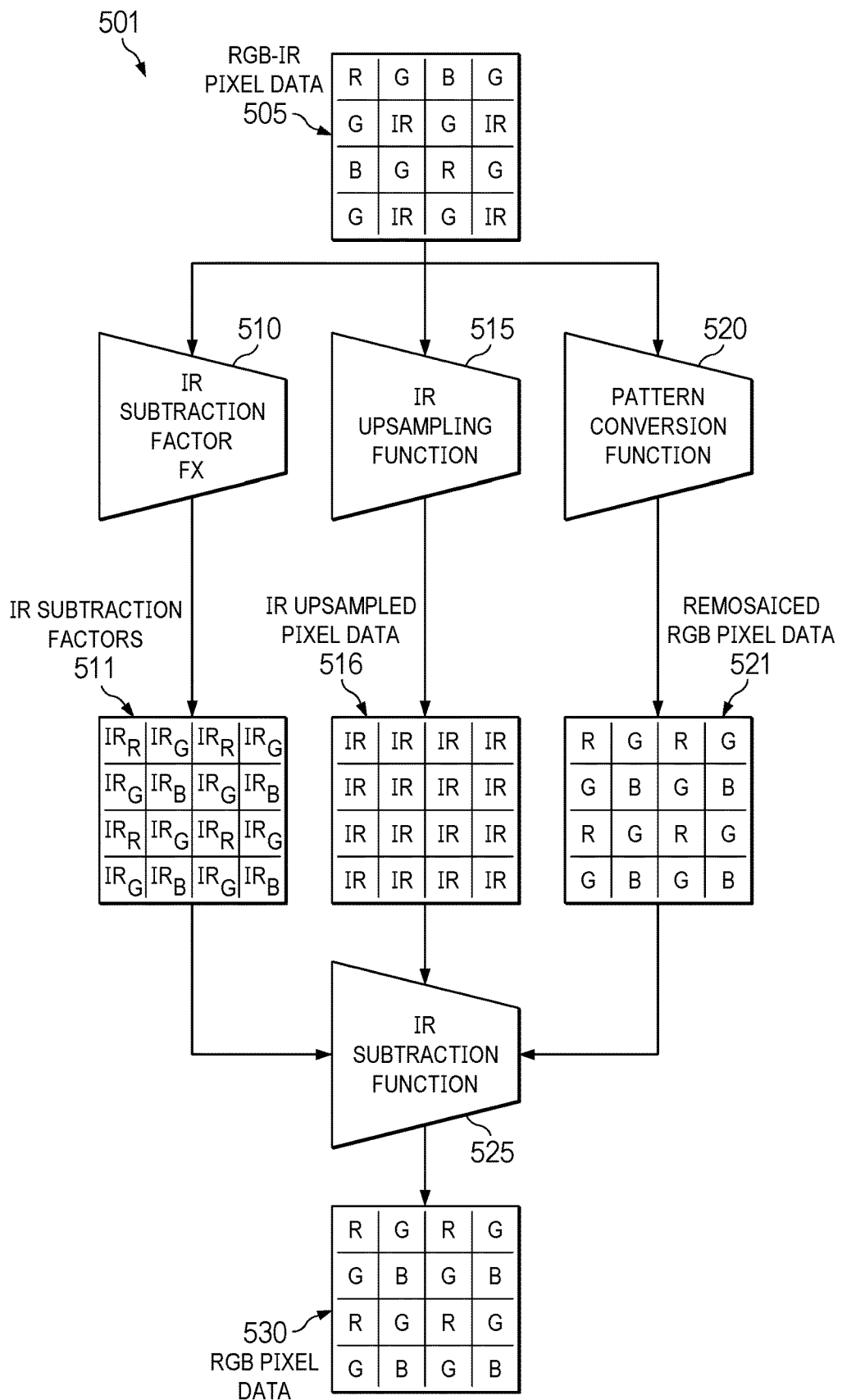
FIGS. 5A, 5B, and 5C illustrate example representations of processing and converting pixel data from one format to other formats with interpolated values.
Figure 5B:
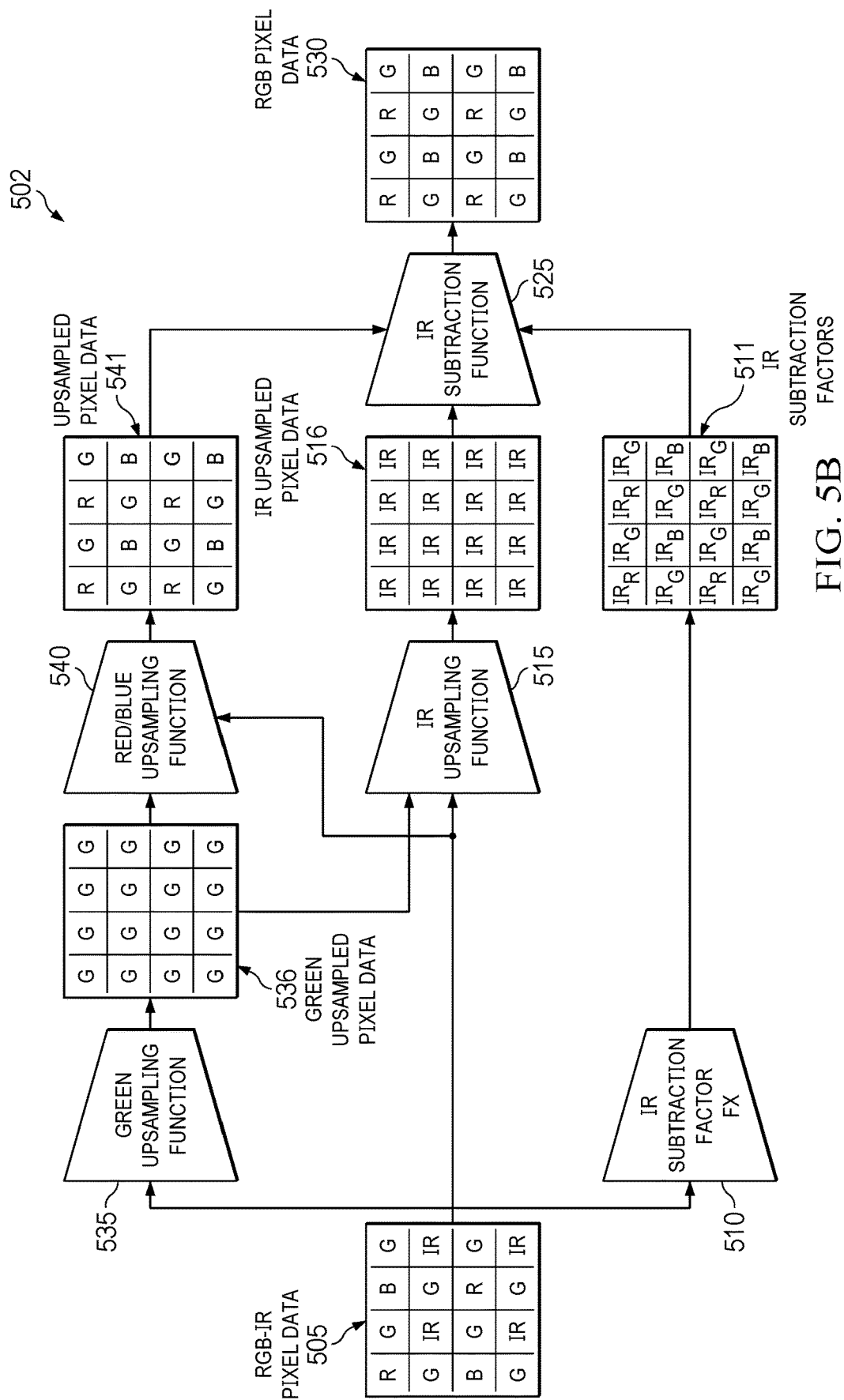
Figure 5C:
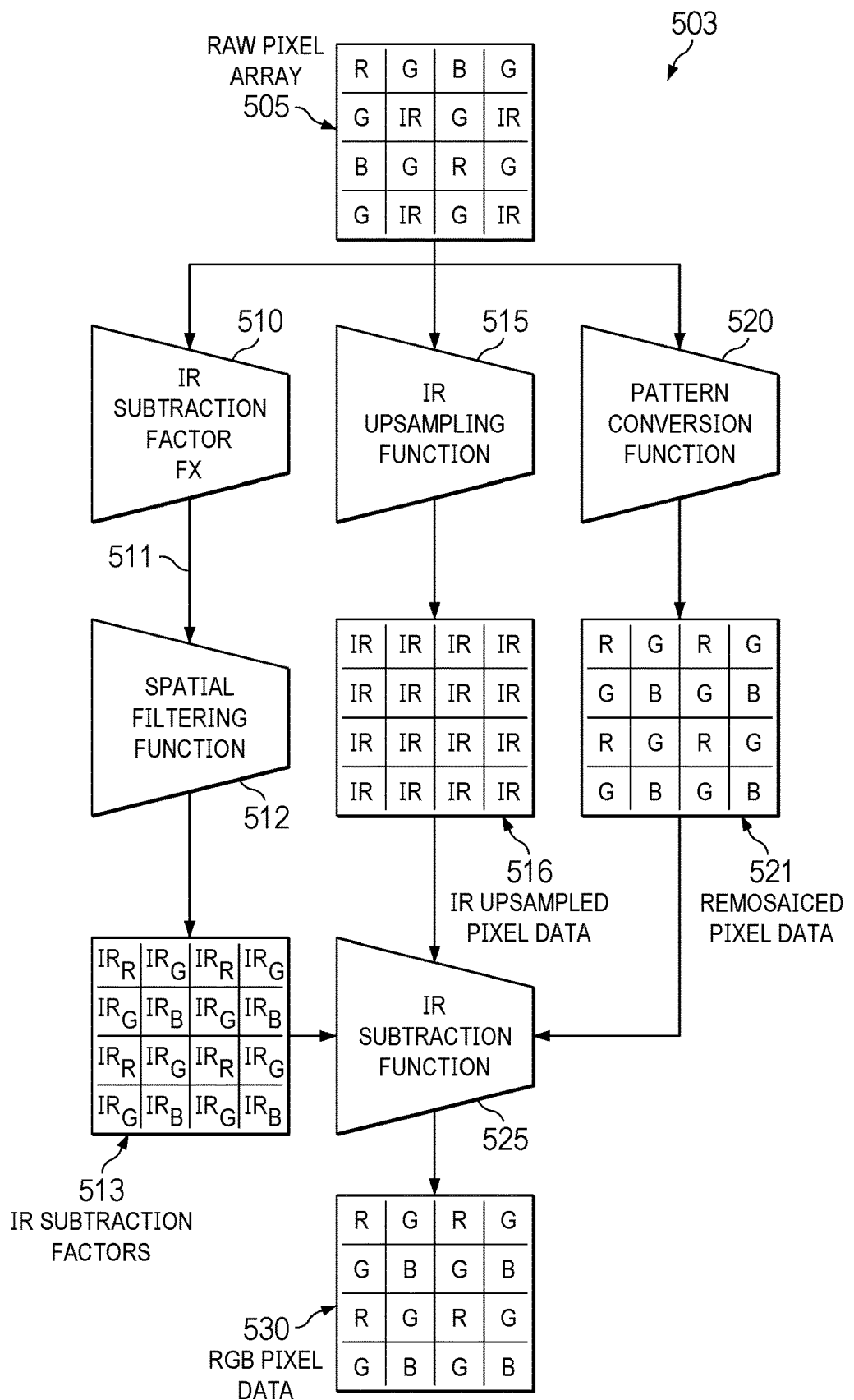

FIGS. 5A, 5B, and 5C illustrate example representations of processing and converting pixel data from one format to other formats. FIG. 5A shows environment 501, which includes RGB-IR pixel data 505, IR subtraction factor function 510, IR upsampling function 515, pattern conversion function 520, and IR subtraction function 525, which together, produce different formats and values from RGB-IR pixel data 505. FIG. 5B shows environment 502, which includes RGB-IR pixel data 505, IR subtraction factor function 510, IR upsampling function 515, green upsampling function 535, red/blue upsampling function 540, and IR subtraction function 525, which together, produce different formats and values from RGB-IR pixel data 505. FIG. 5C shows environment 503, which includes RGB-IR pixel data 505, IR subtraction factor function 510, spatial filtering function 512, IR upsampling function 515, pattern conversion function 520, and IR subtraction function 525, which together, produce different formats and values from RGB-IR pixel data 505. Each of the aforementioned functions may be performed by a pattern conversion component, or a conversion engine of a pattern conversion component, such as pattern conversion component 215 and conversion engine 216 of FIG. 2.

Referring first to FIG. 5A, a conversion engine (e.g., conversion engine 216 of FIG. 2, conversion engine 446 of FIG. 4), configured to perform IR subtraction function 510, IR upsampling function 515, and pattern conversion function 520, obtains RGB-IR pixel data 505. RGB-IR pixel data 505 is representative of pixel data in a 4×4 CFA pattern, such as in a RGB-IR pattern, captured by an imaging system (not shown). The conversion engine can employ such functions on RGB-IR pixel data 505 to produce IR and color images. For example, the conversion engine can use IR subtraction factor function 510 to calculate IR subtraction factors 511, or an amount of IR to be removed from each pixel of RGB-IR pixel data 505, IR upsampling function 515 to interpolate IR pixel values and produce an IR image, and pattern conversion function 520 to interpolate color pixel values and produce one or more color images.

Often, optical color filters (e.g., red, green, and blue color filters), allow IR light to pass through and reach underlying image pixels. Some imaging systems may use a dual-band filter to capture both visible and IR light, which causes IR light to contaminate color pixels. In image processing, IR subtraction is an important activity of decontaminating color pixels (e.g., red, green, and blue pixels) of IR light to produce high resolution images. However, not all red, green, and blue pixels require IR decontamination. For example, for color pixels that are highly saturated, may require little to no IR subtraction. Thus, IR subtraction factor function 510 can be used to remove such IR light values from RGB pixel data of RGB-IR pixel data 505. In various cases, IR subtraction factor function 510 uses algorithms to calculate an amount, or a factor, for each pixel in RGB-IR pixel data 505 (denoted by $IR_X$, where $X$ indicates the color channel). However, in other cases, IR subtraction factor function 510 can be used to calculate fewer factors, such as a number of factors based on color channels or regions of RGB-IR pixel data 505.

In an example where the conversion engine uses IR subtraction function 510 to determine a factor for each pixel, the conversion engine can identify a context of each pixel. Context refers to information or characteristics of RGB-IR pixel data 505. More specifically, context of a given pixel may refer to characteristics of the pixel data at or around a location associated with the given pixel and characteristics of neighboring pixels with respect to the given pixel. For example, for the first red pixel of RGB-IR pixel data 505, context may indicate that the red pixel is in a bright or dark spot, with respect to other pixels, that the red pixel is in a corner and/or near an edge, or the like. The context may also indicate information about nearest-neighboring pixels, such as distance between the given pixel and the nearest-neighboring pixels, brightness or darkness of the nearest-neighboring pixels and associated location(s), and the like. Then, the conversion engine can determine IR subtraction factors 511 for each pixel in RGB-IR pixel data 505 based on the context of each pixel.

The conversion engine also uses IR upsampling function 515 to determine an IR value of each pixel in RGB-IR pixel data 505, and ultimately, produce an IR image from RGB-IR pixel data 505. IR upsampling function 515 can perform various steps to upsample IR values of the pixels of RGB-IR pixel data 505. In various cases, these steps may include identifying values of the pixels in RGB-IR pixel data 505, identifying context of the pixels, and determining one or more upsampled, or interpolated, values for each pixel of RGB-IR pixel data 505 based on the context. More specifically, the conversion engine can identify nearest-neighboring pixels and corresponding values, with respect to a given pixel, from the context. The conversion engine, via upsampling function 515, can use the nearest-neighboring IR pixels, among other information, to interpolate an IR value for the given pixel. IR upsampling function 515 can do this for each pixel of RGB-IR pixel data 505 until IR values are calculated for each pixel in the pattern.

Additionally, the conversion engine uses pattern conversion function 520 to interpolate one or more of a red, green, and blue value for each pixel of RGB-IR pixel data 505. To do so, pattern conversion function 520 identifies values of the pixels in RGB-IR pixel data 505, identifies context of the pixels, and determines a red, green, and/or blue value of each pixel based on the context of the pixel. Following the previous example above with respect to the first red pixel, the conversion engine may identify the nearest-neighboring pixels with respect to the first red pixel, the location of the first red pixel and the nearest-neighboring pixels, and other information about the pixels and corresponding locations (e.g., brightness, hue, saturation). If pattern conversion function 520 is configured to output a red pixel in remosaiced RGB pixel data 521 at the location corresponding to the first red pixel, pattern conversion function 520 can interpolate an upsampled red pixel value. Alternatively, if pattern conversion function 520 is configured to output a blue pixel in remosaiced RGB pixel data 521 at the location of the first red pixel, pattern conversion function 520 can interpolate a blue pixel value at the location of the first red pixel. The conversion engine can perform such processes for each pixel of RGB-IR pixel data 505 to create remosaiced RGB pixel data 521, which includes only red, green, and blue pixels.

Following each of IR subtraction factor function 510, IR upsampling function 515, and pattern conversion function 520, the conversion engine can supply IR subtraction factors 511, IR upsampled pixel data 516, and remosaiced RGB pixel data 521 to IR subtraction function 525 to remove IR contamination from the color pixels and produce RGB pixel data 530. IR subtraction function 525 can perform IR decontamination operations on remosaiced RGB pixel data 521 using IR subtraction factors 511 and IR upsampled pixel data 516. More specifically, the conversion engine, via IR subtraction function 525, can subtract an amount of IR from the red, green, and blue pixels of remosaiced RGB pixel data 521 based on IR subtraction factors 511.

By way of example, red, green, and blue pixels of remosaiced RGB pixel data 521 can be defined as "R," "G," and "B," respectively. IR pixels of IR upsampled pixel data 516 can be defined as "IR." Factors of IR subtraction factors 511 corresponding to red pixels can be defined as $IR_R$, factors corresponding to green pixels can be defined as $IR_G$, and factors corresponding to blue pixels can be defined as $IR_B$. IR subtraction function 525 can use the following equations to determine a pixel value of RGB pixel data 530 corresponding to a pixel of the same color channel and location of remosaiced RGB pixel data 521, where R', G', and B' are pixels of RGB pixel data 530:

$$R'=R-IR_R*IR$$

$$G'=G-IR_G*IR$$

$$B'=B-IR_B*IR.$$

Put another way, for the first red pixel of remosaiced RGB pixel data 521 (the top left corner red pixel of the illustration), IR subtraction function 525 can subtract an amount of IR from the first red pixel based on an IR subtraction factor corresponding to the first red pixel (the factor in the top left corner of IR subtraction factors 511, denoted by $IR_R$, $IR_G$, and $IR_B$) to output a decontaminated first red pixel of RGB pixel data 530 (the top left corner red pixel (R) of RGB pixel data 530). IR subtraction function 525 can repeat for each pixel of remosaiced RGB pixel data 521 to produce RGB pixel data 530.

In FIG. 5B, green upsampling function 535 and red/blue upsampling function 540 may represent specific operations of pattern conversion function 520. In some cases, pattern conversion function 520 may re-use green pixels from RGB-IR pixel data 505 in remosaiced RGB pixel data 521 rather than calculate upsampled green pixel values. However, as illustrated in FIG. 5B, green upsampling function 535 can be included to perform interpolation on green pixels in addition to interpolation of red and blue pixels via red/blue upsampling function 540.

Green upsampling function 535, like pattern conversion 520 of FIG. 5A, can identify pixel values of RGB-IR pixel data 505, identify context of the pixels, and interpolate green pixel values for the pixels based on the context. To interpolate a green pixel value for a given pixel (a non-green pixel), green upsampling function 535 can use one or more neighboring green pixel values and image features near the given pixel (e.g., edges, corners) (i.e., context) to determine missing green pixels of RGB-IR pixel data 505. Green upsampling function 535 outputs green upsampled pixel data 536 and supplies the green pixels to red/blue upsampling function 540 and IR upsampling function 515.

The conversion engine next uses RGB-IR pixel data 505 and green upsampled pixel data 536 to produce upsampled pixel data 541 via red/blue upsampling function 540. Red/blue upsampling function 540 identifies values of the pixels in RGB-IR pixel data 505 and green upsampled pixel data 536, identifies context of the pixels, and determines a red and/or blue value of each pixel based on the context of the pixel. The conversion engine can perform interpolation processes for each pixel of RGB-IR pixel data 505 to create upsampled pixel data 541, which includes red and blue upsampled pixels via red/blue upsampling function 540 and green upsampled pixels via green upsampling function 535.

Upsampled pixel data 541 is passed to IR subtraction function 525 along with IR upsampled data 516 and IR subtraction factors 511. IR subtraction function 525 can then remove IR values from the pixels of upsampled pixel data 541 to provide RGB pixel data 530.

In FIG. 5C, the conversion engine may additionally include spatial filtering to suppress noise in IR subtraction factors and obtain smooth transitions between IR subtraction factors for neighboring pixels. Accordingly, IR subtraction factor function 510 may provide IR subtraction factors 511 to spatial filtering function 512 to produce filtered factors (IR subtraction factors 513) before providing the factors to IR subtraction function 525. Advantageously, because the level of IR contamination is a function of the filter used by the imaging system (e.g., a dual-band filter) and may differ from pixel to pixel, spatial filtering function 512 can help reduce artifacts and sharp contrast between pixels when IR subtraction factors 513 are used by IR subtraction function 525 to remove IR contamination.

Figure 6:
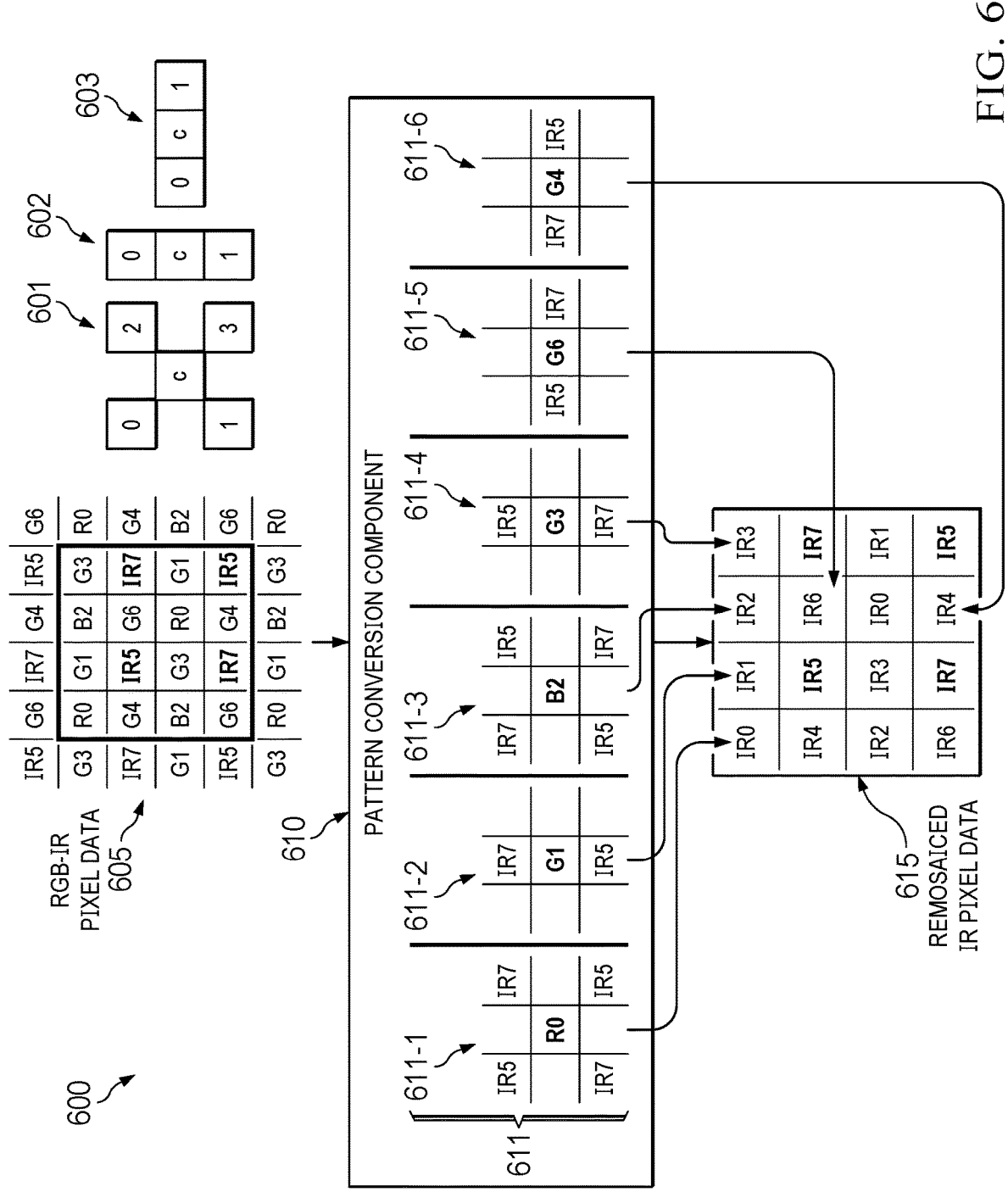
FIG. 6 illustrates an example scheme for interpolating pixel data to convert pixel data from one format to another format using a pattern conversion component.

FIG. 6 illustrates an example scheme for interpolating pixel data to convert pixel data from one format to another format using a pattern conversion component. FIG. 6 shows environment 600, which includes pattern conversion component 610. FIG. 6 also shows reference patterns 601, 602, and 603, which each depict a central pixel (denoted by "c") and a number of neighboring pixels with respect to the central pixel (denoted by "0," "1," "2," and "3"). Pattern conversion component 610 is representative of an image processing pipeline component configured to convert pixel patterns, among other functions, such as pattern conversion component 215 of FIG. 2. More specifically, pattern conversion component 610 can include elements to perform IR upsampling and interpolation, such as IR upsampling function 515 of FIGS. 5A, 5B, and 5C.

Pattern conversion component 610 can be configured to obtain RGB-IR pixel data 605, perform one or more image processing activities on the pixel data, and output remosaiced IR pixel data 615, or pixel data including only IR values, from RGB-IR pixel data 605. RGB-IR pixel data 605 is representative of pixel data in a 4×4 CFA pattern, such as in a RGB-IR pattern, captured by an imaging system (not shown). In environment 600, RGB-IR pixel data 605 includes a 4×4 pattern of red, green, blue, and IR pixels with additional pixels illustrated outside of the 4×4 pattern for reference in interpolation schemes 611. Each of the pixels of RGB-IR pixel data 605 is represented by a letter corresponding to a color channel (R for red, G for green, B for blue, and IR for infrared) followed by a number (0-7). Accordingly, such notation describes the color channel of the pixel and a location in the CFA pattern for interpolation using neighboring pixels with respect to a given pixel. The notation does not necessarily mean that similarly labeled pixels have the same value in RGB-IR pixel data 605. The following discussion of RGB-IR pixel data 605 describes pixels in the 4×4 CFA pattern, not the pixels outside of the illustrated outlined 4×4 pixel pattern. The first row of RGB-IR pixel data 605 includes a red pixel (R0), a green pixel (G1), a blue pixel (B2), and another green pixel (G3), each in individual columns from left to right. The second row of RGB-IR pixel data 605 includes a green pixel (G4), an IR pixel (IR5), another green pixel (G6), and another IR pixel (IR7), each in individual columns from left to right. The third row of RGB-IR pixel data 605 includes a blue pixel (B2), a green pixel (G3), a red pixel (R0), and another green pixel (G1), each in individual columns from left to right. The fourth row of RGB-IR pixel data 605 includes a green pixel (G6), an IR pixel (IR7), another green pixel (G4), and another IR pixel (IR5), each in individual columns from left to right.

Pattern conversion component 610 obtains RGB-IR pixel data 605, including identified pixels and neighbors and performs interpolation on the pixels using interpolation schemes 611. Under interpolation schemes 611, pattern conversion component 610 can produce an IR value for each pixel of RGB-IR pixel data 605 at respective locations in the pattern. For example, for the red pixel in the first row, first column of RGB-IR pixel data 605 (R0), pattern conversion component 610 can interpolate an IR value in the first row, first column of remosaiced IR pixel data 615 (IR0). Similarly, for the first green pixel in the first row, second column of RGB-IR pixel data 605 (G1), pattern conversion component 610 can interpolate an IR value in the first row, second column of remosaiced IR pixel data 615 (IR1). It follows that the number in the notation of the pixels of RGB-IR pixel data 605 corresponds to the number following the interpolated IR value in remosaiced IR pixel data 615.

In performing interpolation schemes 611, pattern conversion component 610 uses IR values of RGB-IR pixel data 605 (denoted by IR5 and IR7) to interpolate IR values at non-IR pixels (i.e., red, green, and blue pixels) of RGB-IR pixel data 605. Depending on the color of a given pixel and the colors of neighboring pixels relative to the given pixel, pattern conversion component 610 can perform one of interpolation schemes 611 resembling one of reference patterns 601, 602, or 603. For example, for red pixels of RGB-IR pixel data 605 (denoted by R0), pattern conversion component 610 uses interpolation scheme 611-1 according to reference pattern 601 (i.e., R0 is the central pixel, IR5 is at neighboring locations "0" and "3," and IR7 is at neighboring locations "1" and "2"). Interpolation scheme 611-1 includes using four neighboring IR pixels, two of IR5 and two of IR7, positioned diagonally from R0 pixels. More specifically, pattern conversion component 610 identifies IR values located diagonally to the top-left (IR5), top-right (IR7), bottom-left (IR7), and bottom-right (IR5) in RGB-IR pixel data 605, with respect to the red pixels, to interpolate IR0 values of remosaiced IR pixel data 615 at the R0 pixel locations of RGB-IR pixel data 605. For green pixels, labeled as G1, of RGB-IR pixel data 605, pattern conversion component 610 uses interpolation scheme 611-2 according to reference pattern 602 (i.e., G1 is the central pixel, IR7 is at neighboring location "0" and IR5 is at neighboring location "1"). Interpolation scheme 611-2 includes using two neighboring IR pixels, one positioned in the same row and one column below G1 (IR5), and one positioned in the same row and one column above G1 (IR7). Using interpolation scheme 611-2 for G1 pixels, pattern conversion component 610 can interpolate IR1 values of remosaiced IR pixel data 615 at the G1 pixel locations of RGB-IR pixel data 605. For blue pixels of RGB-IR pixel data 605 (denoted by B2), pattern conversion component 610 uses interpolation scheme 611-3 according to reference pattern 601 (i.e., B2 is the central pixel, IR7 is at neighboring locations "0" and "3," and IR5 is at neighboring locations "1" and "2"). Interpolation scheme 611-3 includes using four neighboring IR pixels, two of IR5 and two of IR7, positioned diagonally from B2 pixels. More specifically, pattern conversion component 610 identifies IR values located diagonally to the top-left (IR7), top-right (IR5), bottom-left (IR5), and bottom-right (IR7) in RGB-IR pixel data 605, with respect to the blue pixels, to interpolate IR2 values of remosaiced IR pixel data 615. For green pixels, labeled as G3, of RGB-IR pixel data 605, pattern conversion component 610 uses interpolation scheme 611-4 according to reference pattern 602 (i.e., G3 is the central pixel, IR5 is at neighboring location "0" and IR7 is at neighboring location "1"). Interpolation scheme 611-4 includes using two neighboring IR pixels, one positioned in the same column and one row above G3 (IR5), and one positioned in the same column and one row below G3 (IR7). Using interpolation scheme 611-4 for G3 pixels, pattern conversion component 610 can interpolate IR3 values of remosaiced IR pixel data 615 at the G3 pixel locations of RGB-IR pixel data 605. For green pixels, labeled as G6, of RGB-IR pixel data 605, pattern conversion component 610 uses interpolation scheme 611-5 according to reference pattern 603 (i.e., G6 is the central pixel, IR5 is at neighboring location "0" and IR7 is at neighboring location "1"). Interpolation scheme 611-5 includes using two neighboring IR pixels, one positioned in the same row and one column to the left of G6 (IR5) and one positioned in the same row and one column to the right of G6 (IR7). Using interpolation scheme 611-5 for G6 pixels, pattern conversion component 610 can interpolate IR6 values of remosaiced IR pixel data 615 at the G6 pixel locations of RGB-IR pixel data 605. For green pixels, labeled as G4, of RGB-IR pixel data 605, pattern conversion component 610 uses interpolation scheme 611-6 according to reference pattern 603 (i.e., G4 is the central pixel, IR7 is at neighboring location "0" and IR5 is at neighboring location "1"). Interpolation scheme 611-6 includes using two neighboring IR pixels, one positioned in the same row and one column to the right of G4 (IR5) and one positioned in the same row and one column to the left of G4 (IR7). Using interpolation scheme 611-6 for G4 pixels, pattern conversion component 610 can interpolate IR4 values of remosaiced IR pixel data 615 at the G4 pixel locations of RGB-IR pixel data 605.

In some cases, IR values IR5 and IR7 are used directly from RGB-IR pixel data 605 in remosaiced IR pixel data 615 in respective locations without interpolation. However, in other cases, IR5 and IR7 pixel values may be interpolated or upsampled before placement in remosaiced IR pixel data 615.

Upon interpolation using interpolation schemes 611, pattern conversion component 610 produces a 2×2 CFA pattern including IR pixels, or remosaiced IR pixel data 615. Pattern conversion 610 can then provide remosaiced IR pixel data 615 downstream for use by other image processing components or peripherals.

Figure 7A:
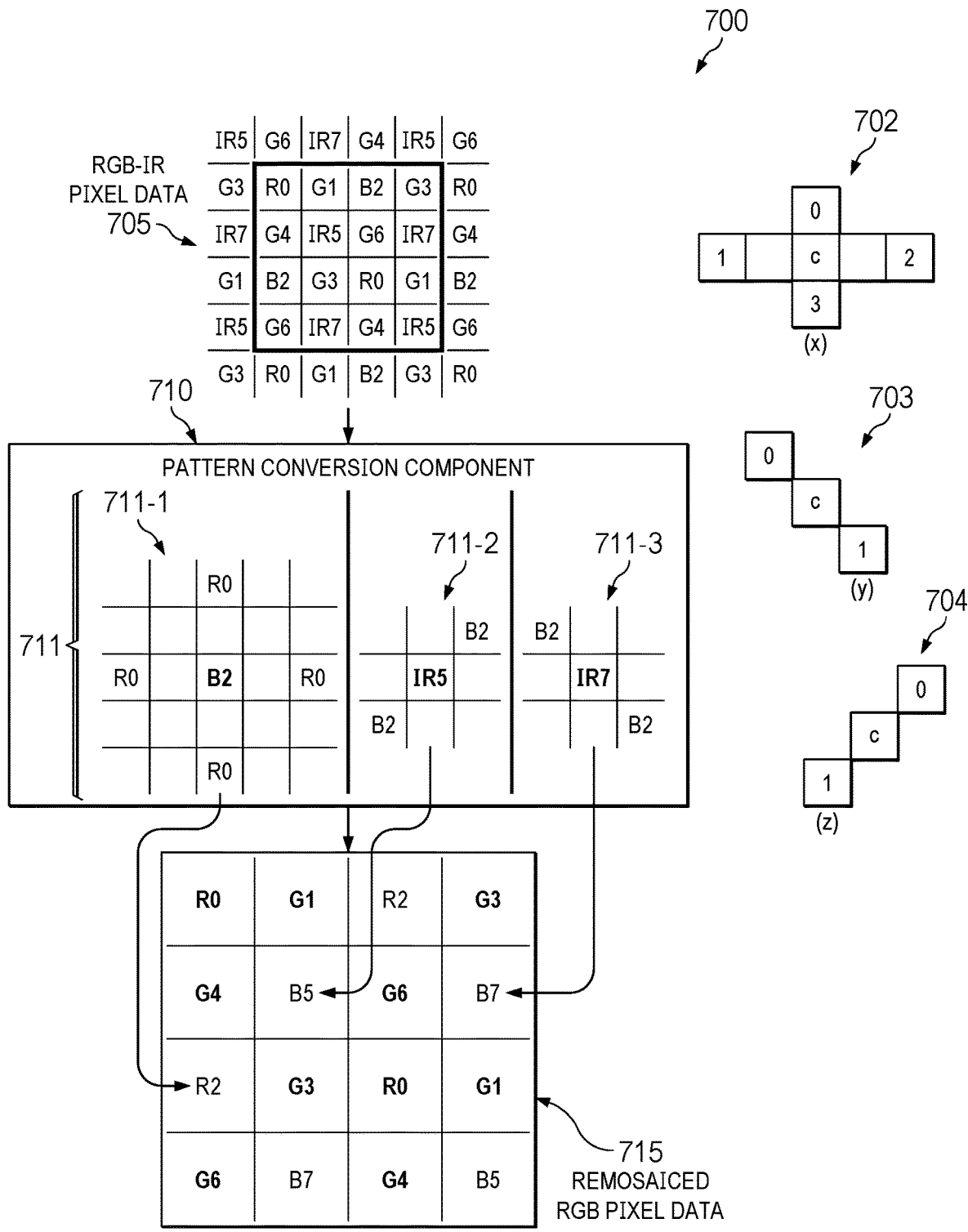
FIGS. 7A and 7B illustrate example schemes for interpolating pixel data to convert pixel data from one format to another format using a pattern conversion component.
Figure 7B:
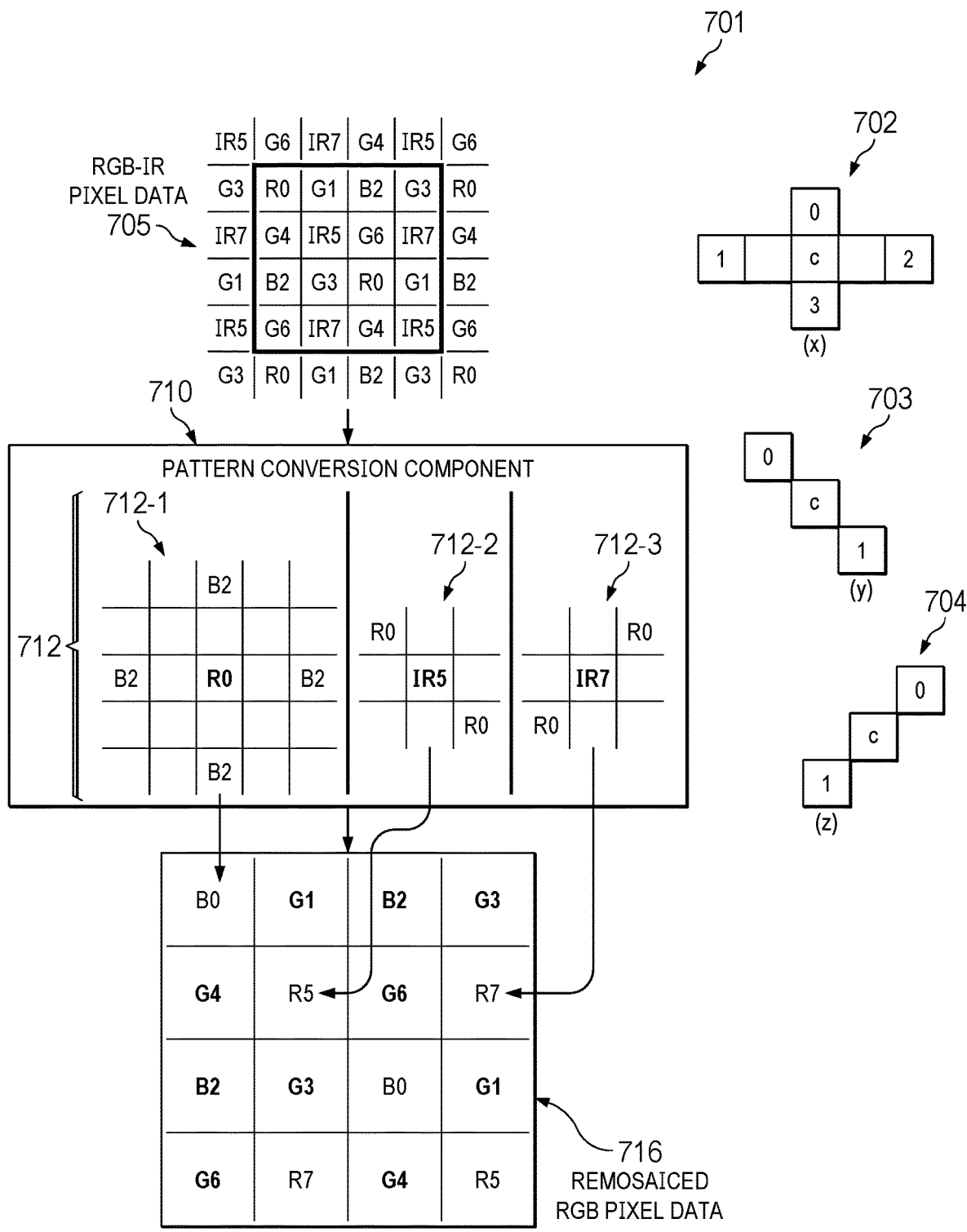

FIGS. 7A and 7B illustrate example schemes for interpolating pixel data to convert pixel data from one format to another format using a pattern conversion component. FIG. 7A shows environment 700, which includes pattern conversion component 710. FIG. 7B shows environment 701, which also includes pattern conversion component 710. FIGS. 7A and 7B also show reference patterns 702, 703, and 704, which each depict a central pixel (denoted by "c") and a number of neighboring pixels with respect to the central pixel (denoted by "0," "1," "2," and "3"). Pattern conversion component 710 is representative of an image processing pipeline component configured to convert pixel patterns, among other functions, such as pattern conversion component 215 of FIG. 2. More specifically, pattern conversion component 710 may represent or include a pattern conversion component configured to upsample and interpolate red, green, and blue pixels, such as pattern conversion function 520 of FIG. 5A and/or green upsampling function 535 and red/blue upsampling function 540 of FIGS. 5B and 5C.

In both FIGS. 7A and 7B, pattern conversion component 710 can be configured to obtain RGB-IR pixel data 705, perform one or more image processing activities on the pixel data, and output remosaiced RGB pixel data 715, or pixel data including only red, green, and blue values, using RGB-IR pixel data 705. RGB-IR pixel data 705 is representative of pixel data in a 4×4 CFA pattern, such as in a RGB-IR pattern, captured by an imaging system (not shown). In environments 700 and 701, RGB-IR pixel data 705 includes a 4×4 pattern of red, green, blue, and IR pixels with additional pixels illustrated outside of the 4×4 pattern for reference in interpolation schemes 711 and 712. Each of the pixels of RGB-IR pixel data 705 is represented by a letter corresponding to a color channel (R for red, G for green, B for blue, and IR for infrared) followed by a number (0-7). Accordingly, such notation describes the color channel of the pixel and a location in the CFA pattern for interpolation using neighboring pixels with respect to a given pixel. Such notation does not necessarily mean that similarly labeled pixels have the same value in RGB-IR pixel data 705.

The following discussion of RGB-IR pixel data 705 describes pixels in the 4×4 CFA pattern, not the pixels outside of the illustrated outlined 4×4 pixel pattern. The first row of RGB-IR pixel data 705 includes a red pixel (R0), a green pixel (G1), a blue pixel (B2), and another green pixel (G3), each in individual columns from left to right. The second row of RGB-IR pixel data 705 includes a green pixel (G4), an IR pixel (IR5), another green pixel (G6), and another IR pixel (IR7), each in individual columns from left to right. The third row of RGB-IR pixel data 705 includes a blue pixel (B2), a green pixel (G3), a red pixel (R0), and another green pixel (G1), each in individual columns from left to right. The fourth row of RGB-IR pixel data 705 includes a green pixel (G6), an IR pixel (IR7), another green pixel (G4), and another IR pixel (IR5), each in individual columns from left to right.

In environment 700 of FIG. 7A, pattern conversion component 710 obtains RGB-IR pixel data 705, including identified pixels and neighbors and performs interpolation on the pixels using interpolation schemes 711. Under interpolation schemes 711, pattern conversion component 710 can produce red values at the locations of blue pixels and blue values at the locations of IR pixels of RGB-IR pixel data 705. For example, for the blue pixel in the third row, first column of RGB-IR pixel data 705 (B2), pattern conversion component 710 can interpolate a red value in the third row, first column of remosaiced RGB pixel data 715 (R2). Similarly, for the IR pixel in the second row, second column of RGB-IR pixel data 705 (IR5), pattern conversion component 710 can interpolate a blue value in the second row, second column of remosaiced RGB pixel data 715 (B5). It follows that the number in the notation of the pixels of RGB-IR pixel data 705 corresponds to the number following the interpolated red or blue value in remosaiced RGB pixel data 715.

In performing interpolation schemes 711, pattern conversion component 710 uses red and blue values of RGB-IR pixel data 705 (denoted by R0 and B2) to interpolate red and blue values at the locations of blue and IR pixels, respectively, of RGB-IR pixel data 705. Depending on the color of a given pixel and the colors of neighboring pixels relative to the given pixel, pattern conversion component 710 can perform one of interpolation schemes 711 resembling one of reference patterns 702, 703, or 704. For blue pixels of RGB-IR pixel data 705 (denoted by B2), pattern conversion component 710 uses interpolation scheme 711-1 according to reference pattern 702 (i.e., B2 is the central pixel, R0 is at neighboring locations "0", "1," "2," and "3"). Interpolation scheme 711-1 includes using four neighboring R0 pixels with respect to B2 pixels to interpolate R2 values of remosaiced RGB pixel data 715 at the B2 pixel locations of RGB-IR pixel data 705. More specifically, pattern conversion component 710 identifies one red pixel positioned two rows directly above and in the same column as B2, one red pixel two rows directly below and in the same column as B2, one red pixel two columns to the left and in the same row as B2, and one red pixel two columns to the right and in the same row as B2 to interpolate R2 from B2. For some IR pixels, labeled as IR5, of RGB-IR pixel data 705, pattern conversion component 710 uses interpolation scheme 711-2 according to reference pattern 704 (i.e., IR5 is the central pixel and B2 is at neighboring locations "0" and "1"). Interpolation scheme 711-2 includes using two neighboring B2 pixels, one positioned diagonally to the bottom left and one positioned diagonally to the top right from a IR5 pixel. Using interpolation scheme 711-2 for IR5 pixels, pattern conversion component 710 can interpolate blue pixel values (denoted by B5) of remosaiced RGB pixel data 715 at the IR5 pixel locations of RGB-IR pixel data 705. For other IR pixels of RGB-IR pixel data 705 (denoted by IR7), pattern conversion component 710 uses interpolation scheme 711-3 according to reference pattern 703 (i.e., IR7 is the central pixel and B2 is at neighboring locations "0" and "1"). Interpolation scheme 711-3 includes using two neighboring B2 pixels, one positioned diagonally to the top left, and one positioned diagonally to the bottom right from an IR7 pixel. Using interpolation scheme 711-3 for IR7 pixels, pattern conversion component 710 can interpolate blue pixel values (denoted by B7) of remosaiced RGB pixel data 715 at the IR7 pixel locations of RGB-IR pixel data 705.

Following interpolation using interpolation schemes 711, pattern conversion component 710 produces a 2×2 CFA pattern including red, green, and blue pixels (e.g., a Bayer pattern), or remosaiced RGB pixel data 715. Pattern conversion 710 can then provide remosaiced RGB pixel data 715 downstream for use by other image processing components or peripherals.

In operating environment 701 of FIG. 7B, an alternative interpolation scheme, interpolation scheme 712, can be implemented by pattern conversion 710 using one of reference patterns 702, 703, or 704. In interpolation scheme 712, pattern conversion component 710 can replace red pixels (R0) with blue values (B0) and IR pixels (IR5 and IR7) with red values (R5 and R7, respectively) to produce remosaiced RGB pixel data 716.

For red pixels of RGB-IR pixel data 705 (denoted by R0), pattern conversion component 710 uses interpolation scheme 712-1 according to reference pattern 702. Interpolation scheme 712-1 includes using four neighboring B2 pixels with respect to R0 pixels to interpolate B0 values of remosaiced RGB pixel data 715 at the R0 pixel locations of RGB-IR pixel data 705. More specifically, pattern conversion component 710 identifies one blue pixel positioned two rows directly above and in the same column as R0, one blue pixel two rows directly below and in the same column as R0, one blue pixel two columns to the left and in the same row as R0, and one blue pixel two columns to the right and in the same row as R0 to interpolate B0 from R0. For some IR pixels, labeled as IR5, of RGB-IR pixel data 705, pattern conversion component 710 uses interpolation scheme 712-2 according to reference pattern 703. Interpolation scheme 712-2 includes using two neighboring R0 pixels, one positioned diagonally to the top left, and one positioned diagonally to the bottom right from IR5 pixels. Using interpolation scheme 712-2 for IR5 pixels, pattern conversion component 710 can interpolate red pixel values (denoted by R5) of remosaiced RGB pixel data 715 at the IR5 pixel locations of RGB-IR pixel data 705. For other IR pixels of RGB-IR pixel data 705 (denoted by IR7), pattern conversion component 710 uses interpolation scheme 712-3 according to reference pattern 704. Interpolation scheme 712-3 includes using two neighboring R0 pixels, one positioned diagonally to the bottom left and one positioned diagonally to the top right from IR7 pixels. Using interpolation scheme 712-3 for IR7 pixels, pattern conversion component 710 can interpolate red pixel values (denoted by R7) of remosaiced RGB pixel data 715 at the IR7 pixel locations of RGB-IR pixel data 705. Then, pattern conversion component 710 can provide remosaiced RGB pixel data 716 downstream for use by other image processing components or peripherals.

The following scenarios refer to elements of FIGS. 6, 7A, and 7B, and more specifically detail how interpolation schemes 611, 711, and 712 can be performed depending on the number of neighboring pixels required for interpolation and arranged with respect to reference patterns 601, 602, 603, 702, 703, and 704. In a first scenario where four neighboring pixels are needed for interpolation (i.e., interpolation schemes 611-1, 611-3, 711-1 and 712-1), the required green values at the given location may be defined as $G_c$, and the neighboring green pixels may be defined as $G_0$, $G_1$, $G_2$, and $G_3$ and come from 536. $G_C$ refers to the central pixel, such as a pixel in location "c" of the reference patterns of FIGS. 6, 7A, and 7B. $G_0$, $G_1$, $G_2$, and $G_3$ refer to neighboring pixels with respect to the central pixel located in positions "0," "1," "2," or "3," respectively, as depicted in reference patterns of FIGS. 6, 7A, and 7B. Source pixels from corresponding neighboring non-green color channels (e.g., red, blue, or IR) being interpolated may be defined as $I_0$, $I_1$, $I_2$, and $I_3$, where $I_0$, $I_1$, $I_2$, and $I_3$ correspond to neighboring pixels with respect to the central pixel located in positions "0," "1," "2," or "3," respectively, as depicted in reference patterns of FIGS. 6, 7A, and 7B. A maximum value among the pixels of RGB-IR pixel data 605 or 705, $V_{MAX}$, may also be defined. In an approach under the first scenario where four neighboring pixels, with respect to the given pixel, can be used from RGB-IR pixel data (RGB-IR pixel data 605, RBG-IR pixel data 705) for interpolation, gradient values ("Dr") can be calculated using the given pixel and the neighboring pixels from the following equations:

$$D_0 = 2 \times G_c - G_1 - G_2$$

$$D_1 = 2 \times G_c - G_0 - G_3$$

$$D_2 = 2 \times G_c - G_0 - G_2$$

$$D_3 = 2 \times G_c - G_2 - G_3$$

$$D_4 = 2 \times G_c - G_3 - G_1$$

$$D_5 = 2 \times G_c - G_1 - G_0$$

$$D_6 = G_c - G_0$$

$$D_7 = G_c - G_1$$

$$D_8 = G_c - G_2$$

$$D_9 = G_c - G_3$$

$$D_{10} = 4 \times G_c - G_0 - G_1 - G_2 - G_3.$$

Then, the given pixel can be compared to the neighboring pixels and the maximum value. If $G_c = G_0 = G_1 = G_2 = G_3 = V_{MAX}$, then four green pixels, to be used for interpolation, can be defined as $G_{(0)}$, $G_{(1)}$, $G_{(2)}$, and $G_{(3)}$, whereby:

$$G_{(0)} = G_{(1)} = G_{(2)} = G_{(3)} = V_{MAX}$$

Additionally, the source pixels, from either the red, blue, or IR channel can be defined as $I_{(0)}$, $I_{(1)}$, $I_{(2)}$, and $I_{(3)}$, whereby:

$$I_{(0)} = I_0, I_{(1)} = I_1, I_{(2)} = I_2, I_{(3)} = I_3.$$

Under this approach using four neighboring pixels to interpolate a red, blue, or IR value, a gradient, $D_{(0)}$, can be chosen using $D_{10}$ (above) for constant hue and color interpolation.

However, if the given pixel and the neighboring pixels do not equal each other nor $V_{MAX}$, then two of the four neighboring pixels may be used to interpolate the given pixel. Under this approach using two neighboring pixels to interpolate a pixel value, the following logic may be used by red/blue upsampling function 540 and IR upsampling function 515, where $T_S$ is a defined threshold over gradient levels to identify the context as:

If $(|D_0| \leq |D_1|$ AND $|D_0| < T_1)$
  Then $G_{(0)} = G_1$, $G_{(1)} = G_3$, $I_{(0)} = I_1$, $I_{(1)} = I_3$, $D_{(0)} = D_0$
Else If $(|D_1| < T_1)$
  Then $G_{(0)} = G_0$, $G_{(1)} = G_2$, $I_{(0)} = I_0$, $I_{(1)} = I_2$, $D_{(0)} = D_1$
Else:
  If $(|D_2| \leq |D_3|$ AND $|D_2| \leq |D_4|$ AND $|D_2| \leq |D_5|$ AND $|D_2| < T_2)$
    Then $G_{(0)} = G_0$, $G_{(1)} = G_2$, $I_{(0)} = I_0$, $I_{(1)} = I_2$, $D_{(0)} = D_2$
  Else If $(|D_3| \leq |D_4|$ AND $|D_3| \leq |D_5|$ AND $|D_3| < T_2)$
    Then $G_{(0)} = G_2$, $G_{(1)} = G_3$, $I_{(0)} = I_2$, $I_{(1)} = I_3$, $D_{(0)} = D_3$ -continued Else If $(|D_4| \leq |D_5|$ AND $|D_4| < T_2)$
  Then $G_{(0)} = G_3$, $G_{(1)} = G_1$, $I_{(0)} = I_3$, $I_{(1)} = I_1$, $D_{(0)} = D_4$
Else If $(|D_5| < T_2)$
  Then $G_{(0)} = G_1$, $G_{(1)} = G_0$, $I_{(0)} = I_1$, $I_{(1)} = I_0$, $D_{(0)} = D_5$.

If none of the above conditions are met, a pattern conversion component (e.g., pattern conversion component 610, pattern conversion component 710) can follow an approach using one neighboring pixel, with respect to the given pixel, using the following equations:

If $(|D_6| \leq |D_7|$ AND $|D_6| \leq |D_8|$ AND $|D_6| \leq |D_9|$ AND $|D_6| < T_3)$
  Then $G_{(0)} = G_0$, $I_{(0)} = I_0$, $D_{(0)} = D_2$
Else If $(|D_7| \leq |D_8|$ AND $|D_7| \leq |D_9|$ AND $|D_7| < T_3)$
  Then $G_{(0)} = G_1$, $I_{(0)} = I_1$, $D_{(0)} = D_7$
Else If $(|D_8| \leq |D_9|$ AND $|D_8| < T_3)$
  Then $G_{(0)} = G_2$, $I_{(0)} = I_2$, $D_{(0)} = D_8$
Else If $(|D_9| < T_3)$
  Then $G_{(0)} = G_3$, $I_{(0)} = I_3$, $D_{(0)} = D_9$.

Under this first scenario, when four neighboring pixels can be used, the pattern conversion component can use the following equations to interpolate the given pixel ($I_C$) using either constant hue or constant color difference interpolation techniques as:

$$I_C = \left(\frac{G_c}{4} \sum_{k=0}^{3} \left(\frac{I_{(k)}}{G_{(k)}}\right)\right) + T_s(D_{(0)}),$$

where $$G_{(k)} = \begin{cases} 1, & IF\,G_{(k)} == 0 \\ G_{(k)}, & \text{Otherwise} \end{cases}.$$

When only two neighboring pixels can be used, the pattern conversion component can use the following equation to interpolate the given pixel:

$$I_C = \left(\frac{G_c}{2} \sum_{k=0}^{1} \left(\frac{I_{(k)}}{G_{(k)}}\right)\right) + T_s(D_{(0)}).$$

Finally, when only one neighboring pixel can be used, the pattern conversion component can use the following equation to interpolate the given pixel:

$$I_C = \left(\frac{G_C * I_{(0)}}{G_{(1)}}\right) + T_s(D_{(0)}).$$

In this equation, for constant hue interpolation, the pattern conversion component can set $T_S$ to 0, and for constant color difference interpolation, the pattern conversion component can set $G_C$ and $G_{(k)}$ to 1 and $T_S$ in a range between (0,2].

Alternatively, in a second scenario, the pattern conversion component can interpolate red, green, or IR pixels using two neighboring pixels with respect to a given pixel. In this second scenario, the pattern conversion component can use one or more of interpolation schemes 611 (e.g., 611-2, 611-4, 611-5, 611-6) or 711 (e.g., 711-2, 711-3), respectively. The required green values at a given location may be defined as $G_C$, and the neighboring green pixels may be defined as $G_0$ and $G_1$. Source pixels from corresponding neighboring non-green color channels (e.g., red, blue, or IR) being interpolated may be defined as $I_0$, and $I_1$. A maximum value, $V_{MAX}$, for the pixels of RGB-IR pixel data 605 or RGB-IR pixel data 705 can also be defined. Under this scenario, gradient values ("$D_n$") can be calculated using the given pixel and the neighboring pixels using the following equations:

$$D_0 = 2 \times G_c - G_0 - G_1$$

$$D_1 = G_c - G_0$$

$$D_2 = G_c - G_1.$$

Again, the given pixel can be compared to the neighboring pixels and the maximum value. If $G_C = G_0 = G_1 = V_{MAX}$, then two green pixels to be used for interpolation can be defined as $G_{(0)}$ and $G_{(1)}$, whereby:

$$G_{(0)} = G_{(1)} = V_{MAX}.$$

Additionally, the source pixels, from either the red, blue, or IR channel can be defined as $I_{(0)}$, and $I_{(1)}$, whereby:

$$I_{(0)} = I_0, I_{(1)} = I_1.$$

If, however, the given pixel and the neighboring pixels do not equal each other nor $V_{MAX}$, then, the following logic may be used by the upsampling function, such as 515 and 540 of FIG. 5, where T is a defined decision threshold over gradient levels to identify the context as:

If ($|D_0| < T_1$)
  Then $G_{(0)} = G_0$, $G_{(1)} = G_1$, $I_{(0)} = I_0$, $I_{(1)} = I_1$, $D_{(0)} = D_0$.

If this condition is met, then one neighboring pixel can be used to interpolate the given pixel. Under this approach, the pattern conversion component may use the following logic:

If ($|D_1| \leq |D_2|$)
  Then $G_{(0)} = G_0$, $I_{(0)} = I_0$, $D_{(0)} = D_1$
Else
  $G_{(0)} = G_1$, $I_{(0)} = I_1$, $D_{(0)} = D_2$ Under this second scenario, the pattern conversion component can use the following equation to interpolate the given pixel:

$$I_C = \left(\frac{G_c}{2} \sum_{k=0}^{1} \left(\frac{I_{(k)}}{G_{(k)}}\right)\right) + T_s(D_{(0)}).$$

When only one neighboring pixel can be used, the pattern conversion can use the following equation to interpolate the given pixel:

$$I_C = \left(\frac{G_C * I_{(0)}}{G_{(1)}}\right) + T_s(D_{(0)}).$$

In this equation, for constant hue interpolation, the pattern conversion component can set $T_S$ to 0, and for constant color interpolation, the pattern conversion component can set $G_C$ and $G_{(k)}$ to 1 and $T_S$ in a range between (0,2].

Despite the above formulations, in some cases, red values (denoted by R0 in FIGS. 6, 7A, and 7B) are used directly from the RGB-IR pixel data in remosaiced RGB pixel data (remosaiced RGB pixel data 715) in respective locations without interpolation. Likewise, green values (denoted by G1, G3, G4, and G6) can also be used from the RGB-IR pixel data in the remosaiced RGB pixel data.

Figure 8:
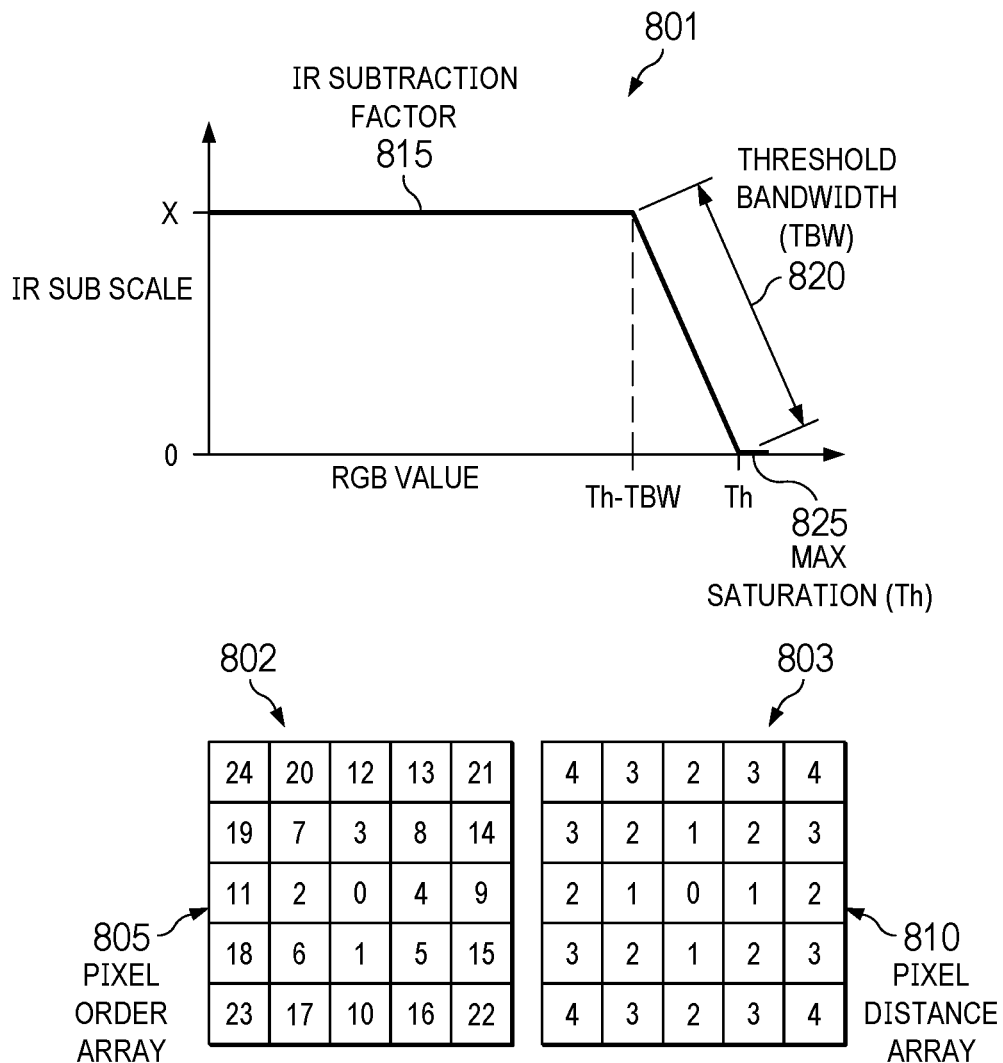
FIG. 8 illustrate example aspects of performing decontamination of pixel data.

FIG. 8 illustrates example aspects of performing IR decontamination of pixel data. FIG. 8 includes aspects 801, 802, and 803. Aspect 801 illustrates a graphical representation demonstrative of values of IR subtraction factors with respect to values of red, green, and blue pixels. Aspect 802 illustrates pixel order array 805. Aspect 803 illustrates pixel distance array 810. For example, techniques described in FIG. 8 may be applied by a pattern conversion component (e.g., pattern conversion component 215 of FIG. 2) during IR subtraction activities (e.g., IR subtraction factor function 510 of FIG. 5).

Aspect 801 illustrates IR subtraction factor 815, representative of a value greater than zero (here, value x), and defined and used by a pattern conversion component when performing IR subtraction functions on pixels. A pattern conversion component can utilize upsampled IR pixel values of a CFA pattern and multiply the upsampled IR pixel values by IR subtraction factor 815 to subtract an amount of IR from a red, green, or blue pixel of an RGB CFA pattern. When the value of a red, green, or blue pixel reaches a threshold, maximum saturation 825 (Th), then the pattern conversion component can set IR subtraction factor 815 to zero to avoid removing IR from the colored pixel unnecessarily. However, when the pattern conversion component removes IR from some pixels at a factor (x) and does not remove any IR from other pixels, resulting images may include artifacts and sharp boundaries between these types. To alleviate this issue, threshold bandwidth 820 (TBW) can be introduced. Within threshold bandwidth 820, the IR subtraction factor can be set to any value between zero and x. Accordingly, for any red, green, and/or blue pixels having values between Th-TBW and Th, the pattern conversion component can use an IR subtraction function between zero and x to gradually transition between R, G, and B pixel values having IR removed and saturated pixels.

Aspect 802 illustrates pixel order array 805 used by a pattern conversion component to partially calculate IR subtraction factor 815. Pixel order array 805 illustrates a 5×5 array of 25 neighborhood pixels, wherein each pixel in pixel order array 805 has a number between 0 and 24. The central pixel of pixel order array 805 is indicated by the number 0. Pixels further away from the central pixel are assigned higher numbers. The pattern conversion component can identify the value of each pixel in the 5×5 array beginning with the central pixel (0) and progressing sequentially through the array to the last pixel (24). In an example, the pattern conversion component identifies that a pixel at number 7 of the array has a value highest ($I_{MAX}$) among the red, green, and blue pixels in the neighborhood and its value exceeds maximum threshold 820 (Th-TBW). After identifying such a saturated pixel, the pattern conversion component identifies the pixel's distance from the central pixel of the array using pixel distance array 810 illustrated in aspect 803.

Aspect 803 illustrates pixel distance array 810, which illustrates a 5×5 array of neighborhood pixels, wherein each pixel in pixel distance array 810 has a number of either 0, 1, 2, 3, or 4, which indicates the distance of a given pixel from the central pixel. Like pixel order array 805, the central pixel of pixel distance array 810 is indicated by the number 0, while pixels further away from the central pixel are assigned higher numbers. For example, pixels in the same row as the central pixel but in directly adjacent columns from the central pixel and pixels in the same column as the central pixel but in rows directly above and below the central pixel have a number of 1 because those pixels are only 1 pixel away from the central pixel. In cases where more than one red, green, or blue pixels of an array have the highest value ($I_{MAX}$) and are saturated, or in other words, have a value exceeding the defined threshold (i.e., greater than or equal to Th-TBW), the pattern conversion component can identify the closest pixel to the central pixel for use in calculating the value, X, of IR subtraction factor 815, which is representative an IR subtraction value corresponding to a respective color channel, such as a value denoted by "$IR_R$," "$IR_G$," or "$IR_B$," in IR subtraction factors 511 and 513 of FIGS. 5A, 5B, and 5C. The closest distance to the central pixel can be used and is defined as $D_{MAX}$. Following the previous example where the pattern conversion component identifies that the pixel at number 7 of pixel order array 805 breaches the threshold, the pattern conversion component can identify that the pixel at number 7 has a distance of 2 according to pixel distance array 810 given its location in the 5×5 array. The pattern conversion component can use the following equation to calculate the value, X, of IR subtraction factor 815 as a function of $I_{MAX}$ and $D_{MAX}$:

$$f(I_{MAX}, D_{MAX}) = \begin{cases} x, & I_{MAX} \le Th - TBW \\ x \times (1 - f_d(D_{MAX})) \times \\ (1 - f_v(I_{MAX})), & \text{Otherwise} \end{cases}$$

where x is in a range between [0,2) and can be independently defined for red, green, and blue pixels, $f_d$ is in a range between [0,1] and can represent a non-increasing function with values defined for $D_{MAX}$ as an element of {0,1,2,3,4}, and $f_v(I_{MAX})$ can be defined as:

$$f_v(I_{MAX}) = \min(1, \max(Th - I_{MAX}, 0)/TBW).$$

While some examples provided herein are described in the context of an imaging subsystem, image sensor, layer, or environment, the pattern conversion systems and methods described herein are not limited to such embodiments and may apply to a variety of other processes, systems, applications, devices, and the like. Aspects of the present invention may be embodied as a system, method, computer program product, and other configurable systems. Accordingly, aspects of the present invention may take the form of an entirely hardware embodiment, an entirely software embodiment (including firmware, resident software, microcode, etc.) or an embodiment combining software and hardware aspects that may all generally be referred to herein as a "component," "circuit," "module," or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are inclusive meaning "including, but not limited to." In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A. A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. An image processing pipeline, comprising:
   an upstream component;
   a pattern conversion component downstream with respect to the upstream component in the image processing pipeline; and
   a downstream component relative to the pattern conversion component;
   wherein the pattern conversion component is configured to:
      obtain red, green, blue and infrared (RGB-IR) pixel data produced by the upstream component of the image processing pipeline;
      convert the RGB-IR pixel data into red, green and blue (RGB) pixel data and infrared (IR) pixel data using a conversion engine configured to:
         demosaic the RGB-IR pixel data into the RGB pixel data and the IR pixel data;
         remosaic the RGB pixel data into a RGB pattern and the IR pixel data into an IR pattern; and
         remove IR contamination from the RGB pixel data of the RGB pattern; and
      supply the RGB pattern and the IR pattern to the downstream component of the image processing pipeline.

2. The image processing pipeline of claim 1, wherein the conversion engine is configured to demosaic the RGB-IR pixel data into the RGB pixel data and the IR pixel data by:
   for each pixel of the RGB-IR pixel data:
      identifying a context of the pixel;
      interpolating, based on the context of the pixel, one of a red, green, or blue pixel value for the RGB pixel data; and
      interpolating, based on the context of the pixel, an IR pixel value for the IR pixel data.

3. The image processing pipeline of claim 2, wherein the context comprises information of the RGB-IR pixel data at a location associated with a pixel and information of neighboring pixels, with respect to the pixel, of the RGB-IR pixel data.

4. The image processing pipeline of claim 2, wherein the conversion engine is configured to remosaic the RGB pixel data into the RGB pattern and the IR pixel data into the IR pattern by:
   mapping the interpolated red, green, and blue pixel values to locations in the RGB pattern; and
   mapping the interpolated IR pixel values to locations in the IR pattern.

5. The image processing pipeline of claim 2, wherein the conversion engine is further configured to determine, for each pixel of the RGB-IR pixel data, a first amount of the IR contamination of the pixel.

6. The image processing pipeline of claim 5, wherein the conversion engine is further configured to determine, for each pixel of the RGB-IR pixel data, whether an interpolated pixel value of the pixel exceeds a threshold value.

7. The image processing pipeline of claim 6, wherein the conversion engine is further configured to, for each pixel of the RGB-IR pixel data, subtract the first amount of the IR contamination from the interpolated pixel value of the pixel based on the interpolated pixel value not exceeding the threshold value, and subtract a second amount of the IR contamination from the interpolated pixel value based on the interpolated pixel value exceeding the threshold value, wherein the second amount is less than the first amount.

8. A pattern conversion component in an image processing pipeline, comprising:
   an interface; and
   circuitry coupled to the interface;
   wherein the interface is configured to communicate with an upstream component and a downstream component of the image processing pipeline relative to the pattern conversion component; and
   wherein the circuitry is configured to:
      obtain, via the interface, red, green, blue and infrared (RGB-IR) pixel data produced by the upstream component;
      convert the RGB-IR pixel data into red, green and blue (RGB) pixel data and infrared (IR) pixel data using a conversion engine configured to:
         demosaic the RGB-IR pixel data into the RGB pixel data and the IR pixel data;
         remosaic the RGB pixel data into a RGB pattern and the IR pixel data into an IR pattern; and
         remove IR contamination from the RGB pixel data of the RGB pattern; and
      supply, via the interface, the RGB pattern and the IR pattern to the downstream component.

9. The pattern conversion component of claim 8, wherein the circuitry is configured to demosaic the RGB-IR pixel data into the RGB pixel data and the IR pixel data by:
   for each pixel of the RGB-IR pixel data:
      identifying a context of the pixel;
      interpolating, based on the context of the pixel, one of a red, green, or blue pixel value for the RGB pixel data; and
      interpolating, based on the context of the pixel, an IR pixel value for the IR pixel data.

10. The pattern conversion component of claim 9, wherein the context comprises information of the RGB-IR pixel data at a location associated with a pixel and information of neighboring pixels, with respect to the pixel, of the RGB-IR pixel data.

11. The pattern conversion component of claim 9, wherein the circuitry is configured to remosaic the RGB pixel data into the RGB pattern and the IR pixel data into the IR pattern by:
   mapping the interpolated red, green, and blue pixel values to locations in the RGB pattern; and
   mapping the interpolated IR pixel values to locations in the IR pattern.

12. The pattern conversion component of claim 9, wherein the circuitry is further configured to determine, for each pixel of the RGB-IR pixel data, a first amount of the IR contamination of the pixel.

13. The pattern conversion component of claim 9, wherein the circuitry is further configured to determine, for each pixel of the RGB-IR pixel data, whether an interpolated pixel value of the pixel exceeds a threshold value.

14. The pattern conversion component of claim 13, wherein the circuitry is further configured to, for each pixel of the RGB-IR pixel data, subtract a first amount of the IR contamination from the interpolated pixel value of the pixel based on the interpolated pixel value not exceeding the threshold value, and subtract a second amount of the IR contamination from the interpolated pixel value based on the interpolated pixel value exceeding the threshold value, wherein the second amount is less than the first amount.

15. A method of operating a pattern conversion component of an image processing pipeline, the method comprising:
   obtaining red, green, blue and infrared (RGB-IR) pixel data produced by a first component;
   converting the RGB-IR pixel data into red, green and blue (RGB) pixel data and infrared (IR) pixel data by:
      demosaicing the RGB-IR pixel data into the RGB pixel data and the IR pixel data;
      remosaicing the RGB pixel data into a RGB pattern and the IR pixel data into an IR pattern; and
      removing IR contamination from the RGB pixel data of the RGB pattern; and
   supplying the RGB pattern and IR pattern to a second component.

16. The method of claim 15, wherein demosaicing the RGB-IR pixel data into the RGB pixel data and the IR pixel data comprises:
   for each pixel of the RGB-IR pixel data:
      identifying a context of the pixel;
      interpolating, based on the context of the pixel, one of a red, green, or blue pixel value for the RGB pixel data; and
      interpolating, based on the context of the pixel, an IR pixel value for the IR pixel data.

17. The method of claim 16, wherein the context comprises information of the RGB-IR pixel data at a location associated with a pixel and information of neighboring pixels, with respect to the pixel, of the RGB-IR pixel data.

18. The method of claim 16, wherein remosaicing the RGB pixel data into the RGB pattern and the IR pixel data into the IR pattern comprises:
   mapping the interpolated red, green, and blue pixel values to locations in the RGB pattern; and
   mapping the interpolated IR pixel values to locations in the IR pattern.

19. The method of claim 16, further comprising, determining, for each pixel of the RGB-IR pixel data, a first amount of the IR contamination of a given pixel.

20. The method of claim 19, further comprising, subtracting, for each pixel of the RGB-IR pixel data, the first amount of the IR contamination from an interpolated pixel value of the pixel based on the interpolated pixel value not exceeding a threshold value, and subtracting a second amount of the IR contamination from the interpolated pixel value based on the interpolated pixel value exceeding the threshold value, wherein the second amount is less than the first amount.

* * * * *